(12) United States Patent
Park et al.

(10) Patent No.: US 11,765,719 B2
(45) Date of Patent: Sep. 19, 2023

(54) METHOD FOR TRANSMITTING AND RECEIVING PHYSICAL DOWNLINK SHARED CHANNEL IN WIRELESS COMMUNICATION SYSTEM, AND APPARATUS THEREFOR

(71) Applicant: LG Electronics Inc., Seoul (KR)

(72) Inventors: Jonghyun Park, Seoul (KR); Jiwon Kang, Seoul (KR); Seongwon Go, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/100,902

(22) Filed: Jan. 24, 2023

(65) Prior Publication Data
US 2023/0209543 A1 Jun. 29, 2023

Related U.S. Application Data

(63) Continuation of application No. 17/708,702, filed on Mar. 30, 2022, now Pat. No. 11,606,805, which is a continuation of application No. PCT/KR2020/013521, filed on Oct. 5, 2020.

(60) Provisional application No. 62/915,699, filed on Oct. 16, 2019, provisional application No. 62/910,445, filed on Oct. 3, 2019.

(51) Int. Cl.
*H04W 72/1273* (2023.01)
*H04W 72/044* (2023.01)
*H04W 72/23* (2023.01)
*H04W 80/02* (2009.01)

(52) U.S. Cl.
CPC ....... *H04W 72/1273* (2013.01); *H04W 72/044* (2013.01); *H04W 72/23* (2023.01); *H04W 80/02* (2013.01)

(58) Field of Classification Search
CPC .... H04W 80/02; H04W 72/044; H04W 72/23; H04W 72/1273
USPC ......................................................... 370/329
See application file for complete search history.

(56) References Cited

U.S. PATENT DOCUMENTS

2022/0264577 A1* 8/2022 Bai et al. ............. H04L 5/0023

* cited by examiner

*Primary Examiner* — Peter G Solinsky
(74) *Attorney, Agent, or Firm* — Fish & Richardson P.C.

(57) ABSTRACT

A method of receiving, by a user equipment (UE), a physical downlink shared channel (PDSCH) in a wireless communication system is disclosed. The method comprises receiving configuration information related to the PDSCH, receiving a message representing an activation of a transmission configuration indicator (TCI) state related to the PDSCH, receiving physical downlink control information (DCI) scheduling the PDSCH, and receiving the PDSCH based on the DCI. Specific frequency domains related to the activation are determined based on the message, and the activated TCI states are related to the specific frequency domains.

9 Claims, 13 Drawing Sheets

Base station Rx beam sweeping

UE TX beam (being fixed)

Base station beam being fixed

UE Tx beam sweeping

| R | Serving Cell ID | | | | | BWP ID | | Oct 1 |
|---|---|---|---|---|---|---|---|---|
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |

. . .

| $T_{(N-2)\times 8+7}$ | $T_{(N-2)\times 8+6}$ | $T_{(N-2)\times 8+5}$ | $T_{(N-2)\times 8+4}$ | $T_{(N-2)\times 8+3}$ | $T_{(N-2)\times 8+2}$ | $T_{(N-2)\times 8+1}$ | $T_{(N-2)\times 8}$ | Oct N |

METHOD FOR TRANSMITTING AND RECEIVING PHYSICAL DOWNLINK SHARED CHANNEL IN WIRELESS COMMUNICATION SYSTEM, AND APPARATUS THEREFOR

CROSS-REFERENCE TO RELATED APPLICATIONS

This application is a continuation of U.S. Application No. 17/708,702, filed on Mar. 30, 2022, which is continuation pursuant to 35 U.S.C. § 119(e) of International Application No. PCT/KR2020/013521, filed on Oct. 5, 2020, which claims the benefit of U.S. Provisional Application No. 62/910,445, filed on Oct. 3, 2019 and U.S. Provisional Application No. 62/915,699, filed on Oct. 16, 2019, the contents of which are all hereby incorporated by reference herein in their entirety.

TECHNICAL FIELD

The present disclosure relates to a method of transmitting and receiving a physical downlink shared channel in a wireless communication system and a device therefor.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

SUMMARY

The present disclosure provides a method of transmitting and receiving a physical downlink shared channel.

Specifically, up to 128 TCI states are configured for the purpose of reception of the physical downlink shared channel, and up to 8 TCI states of the configured TCI states are activated. One TCI state of the activated TCI states is indicated by downlink control information scheduling the physical downlink shared channel.

According to the existing method, a message for activation of the TCI state is transmitted per individual CC/BWP. Thus, the existing method causes necessarily an overhead of control signaling for the activation of the TCI state when a single beam (e.g., single TCI state information) is commonly applied to configured bands (component carriers and/or bandwidth parts).

The present disclosure provides a method for solving the above-described problems.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

In one aspect of the present disclosure, there is provided a method of receiving, by a user equipment (UE), a physical downlink shared channel (PDSCH) in a wireless communication system, the method comprising receiving configuration information related to the PDSCH, receiving a message representing an activation of a transmission configuration indicator (TCI) state related to the PDSCH, receiving physical downlink control information (DCI) scheduling the PDSCH, the DCI representing one TCI state of TCI states activated by the message, and receiving the PDSCH based on the DCI.

Specific frequency domains related to the activation are determined based on the message, and the activated TCI states are related to the specific frequency domains.

The specific frequency domains are based on at least one of component carriers (CCs) or bandwidth parts (BWPs), and the specific frequency domains are based on a list which is pre-configured via a higher layer signaling.

The message may be based on a medium access control-control element (MAC CE).

The pre-configured list may be based on one of a plurality of candidate lists.

The message may represent specific TCI states, and the activated TCI states may be based on the specific TCI states and may be related to all or some of the specific frequency domains.

Based on TCI states configured in the specific frequency domains fully overlapping the specific TCI states, respectively, the specific TCI states may be activated for the specific frequency domains.

Based on TCI states configured in one frequency domain of the specific frequency domains partially overlapping the specific TCI states, the specific TCI states may be activated for a frequency domain related to a transmission of the message among the specific frequency domains.

The message may represent specific TCI states, and the activated TCI states may be based on all or some of the specific TCI states.

For a frequency domain configured with TCI states including all the specific TCI states among the specific frequency domains, all the specific TCI states may be activated.

For a frequency domain configured with TCI states including some of the specific TCI states among the specific frequency domains, some of the specific TCI states may be activated.

Based on the activated TCI states being based on some of the specific TCI states, some of the specific TCI states may be mapped to a plurality of states related to a transmission configuration indication field of the DCI based on a pre-configured pattern.

The pre-configured pattern may be a pattern in which some of the specific TCI states are repeated in a specific order based on a TCI state ID.

In another aspect of the present disclosure, there is provided a user equipment (UE) receiving a physical downlink shared channel (PDSCH) in a wireless communication system, the UE comprising one or more transceivers, one or more processors configured to control the one or more transceivers, and one or more memories operably connected to the one or more processors, the one or more memories configured to store instructions performing operations based on a reception of the PDSCH being performed by the one or more processors.

The operations comprise receiving configuration information related to the PDSCH, receiving a message representing an activation of a transmission configuration indicator (TCI) state related to the PDSCH, receiving physical downlink control information (DCI) scheduling the PDSCH, the DCI representing one TCI state of TCI states activated by the message, and receiving the PDSCH based on the DCI, Specific frequency domains related to the activation are determined based on the message, and the activated TCI states are related to the specific frequency domains.

The specific frequency domains are based on at least one of component carriers (CCs) or bandwidth parts (BWPs), and the specific frequency domains are based on a list which is pre-configured via a higher layer signaling.

In another aspect of the present disclosure, there is provided a device comprising one or more memories and one or more processors operatively connected to the one or more memories. The one or more processors are configured to allow the device to receive configuration information related to a physical downlink shared channel (PDSCH), receive a message representing an activation of a transmission configuration indicator (TCI) state related to the PDSCH, receive physical downlink control information (DCI) scheduling the PDSCH, and receive the PDSCH based on the DCI.

The DCI represents one TCI state of TCI states activated by the message. Specific frequency domains related to the activation are determined based on the message, and the activated TCI states are related to the specific frequency domains.

The specific frequency domains are based on at least one of component carriers (CCs) or bandwidth parts (BWPs), and the specific frequency domains are based on a list which is pre-configured via a higher layer signaling.

In another aspect of the present disclosure, there is provided one or more non-transitory computer readable mediums storing one or more instructions, wherein the one or more instructions executable by one or more processors allow a user equipment (UE) to receive configuration information related to a physical downlink shared channel (PDSCH), receive a message representing an activation of a transmission configuration indicator (TCI) state related to the PDSCH, receive physical downlink control information (DCI) scheduling the PDSCH, and receive the PDSCH based on the DCI.

The DCI represents one TCI state of TCI states activated by the message. Specific frequency domains related to the activation are determined based on the message, and the activated TCI states are related to the specific frequency domains.

The specific frequency domains are based on at least one of component carriers (CCs) or bandwidth parts (BWPs), and the specific frequency domains are based on a list which is pre-configured via a higher layer signaling.

In another aspect of the present disclosure, there is provided a method of transmitting, by a base station, a physical downlink shared channel (PDSCH) in a wireless communication system, the method comprising transmitting configuration information related to the PDSCH, transmitting a message representing an activation of a transmission configuration indicator (TCI) state related to the PDSCH, transmitting physical downlink control information (DCI) scheduling the PDSCH, the DCI representing one TCI state of TCI states activated by the message, and transmitting the PDSCH based on the DCI.

Specific frequency domains related to the activation are determined based on the message, and the activated TCI states are related to the specific frequency domains.

The specific frequency domains are based on at least one of component carriers (CCs) or bandwidth parts (BWPs), and the specific frequency domains are based on a list which is pre-configured via a higher layer signaling.

In another aspect of the present disclosure, there is provided a base station transmitting a physical downlink shared channel (PDSCH) in a wireless communication system, the base station comprising one or more transceivers, one or more processors configured to control the one or more transceivers, and one or more memories operably connected to the one or more processors, the one or more memories configured to store instructions performing operations based on a transmission of the PDSCH being performed by the one or more processors.

The operations comprise transmitting configuration information related to the PDSCH, transmitting a message representing an activation of a transmission configuration indicator (TCI) state related to the PDSCH, transmitting physical downlink control information (DCI) scheduling the PDSCH, the DCI representing one TCI state of TCI states activated by the message, and transmitting the PDSCH based on the DCI.

Specific frequency domains related to the activation are determined based on the message, and the activated TCI states are related to the specific frequency domains.

The specific frequency domains are based on at least one of component carriers (CCs) or bandwidth parts (BWPs), and the specific frequency domains are based on a list which is pre-configured via a higher layer signaling.

According to embodiments of the present disclosure, TCI states can be activated for specific frequency domains based on a list which is pre-configured via higher layer signaling.

Accordingly, since the activation of the TCI states can be equally applied to the frequency domains based on the pre-configured list, an overhead of control signaling related to the activation of the TCI states can be reduced. Further, a beam can be updated more efficiently than when a common beam is used for a plurality of frequency domains.

As described above, according to embodiments of the present disclosure, latency and overhead related to a transmission/reception procedure of the PDSCH can be reduced.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

DETAILED DESCRIPTION

Figure 1:
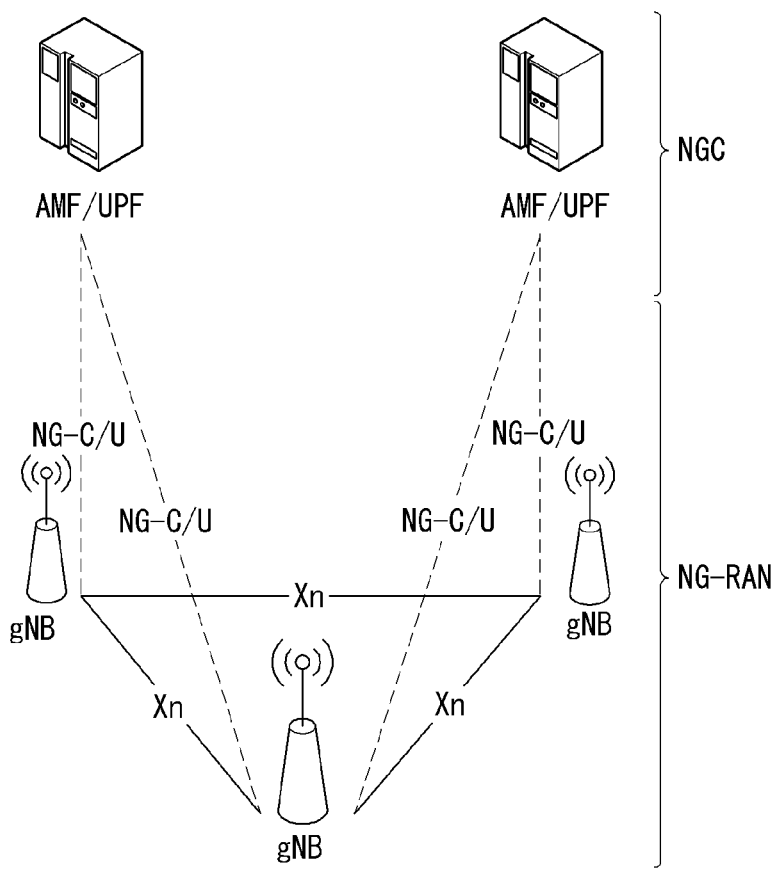
FIG. 1 is a diagram illustrating an example of an overall system structure of NR to which a method proposed in the present disclosure is applicable.

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

Hereinafter, downlink (DL) means communication from a base station to a terminal and uplink (UL) means communication from the terminal to the base station. In the downlink, a transmitter may be part of the base station, and a receiver may be part of the terminal. In the uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11(Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

For clarity of description, the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system, "xxx" means a standard document detail number. The LTE/NR may be collectively referred to as the 3GPP system. Matters disclosed in a standard document published before the present disclosure may refer to a background art, terms, abbreviations, etc., used for describing the present disclosure. For example, the following documents may be referenced.

3GPP LTE
  36.211: Physical channels and modulation
  36.212: Multiplexing and channel coding
  36.213: Physical layer procedures
  36.300: Overall description
  36.331: Radio Resource Control (RRC)
3GPP NR
  38.211: Physical channels and modulation
  38.212: Multiplexing and channel coding
  38.213: Physical layer procedures for control
  38.214: Physical layer procedures for data
  38.300: NR and NG-RAN Overall Description
  36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. As such, the introduction of next-generation radio access technology considering enhanced mobile broadband communication (eMBB), massive MTC (mMTC), ultra-reliable and low latency communication (URLLC) is discussed, and in the present disclosure, the technology is called NR for convenience. The NR is an expression representing an example of 5G radio access technology (RAT).

Three major requirement areas of 5G include (1) an enhanced mobile broadband (eMBB) area, (2) a massive machine type communication (mMTC) area and (3) a ULtra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver may drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system may support remote treatment providing clinical treatment at a distant place. This helps to reduce a barrier for the distance and may improve access to medical services which are not continuously used at remote farming areas. Furthermore, this is used to save life in important treatment and an emergency condition. A radio sensor network based on mobile communication may provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a New RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. By scaling a reference subcarrier spacing by an integer N, different numerologies may be defined.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used at an NG2 reference point between new RAN and NGC.

NG-U: A user plane interface used at an NG3 reference point between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: An end point of NG-U interface.

Overview of System

FIG. 1 illustrates an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an Xn interface.

The gNBs are connected to the NGC via the NG interface.

More specifically, the gNB connects to the access and mobility management function (AMF) via the N2 interface and connects to the user plane function (UPF) via the N3 interface.

New RAT (NR) Numerology and Frame Structure

In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or, $\mu$). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| $\mu$ | $\Delta f = 2^{\mu} \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz - 52600 MHz | 60, 120, 240 kHz |

With regard to the frame structure in the NR system, the size of various fields in the time domain is expressed as a multiple of time unit of $T_s = 1/(\Delta f_{max} \cdot N_f)$, where $\Delta f_{max} = 480 \cdot 10^3$, and $N_f = 4096$. Downlink and uplink transmissions is constituted of a radio frame with a period of $T_f$ -

($\Delta f_{max}N_f/100$) · $T_s$ =10 ms. Here, the radio frame is constituted of 10 subframes each of which has a period of $T_{sf}$ = ($\Delta f_{max}N_f/1000$) · $T_s$ = 1 ms . In this case, one set of frames for uplink and one set of frames for downlink may exist.

Figure 2:
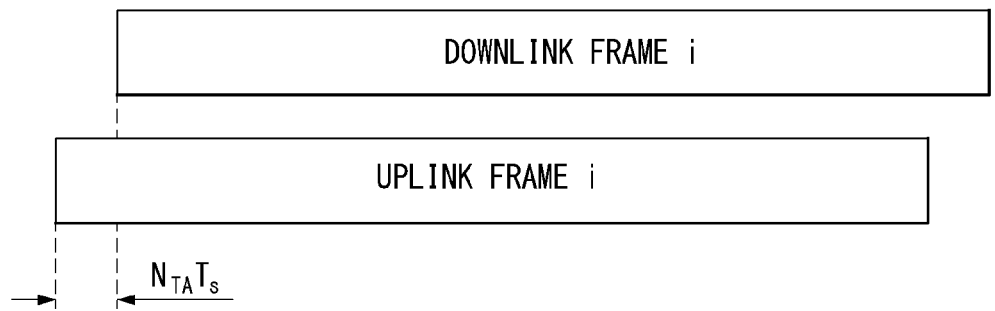
FIG. 2 illustrates a relationship between an uplink frame and a downlink frame in a wireless communication system to which a method proposed by the present disclosure is applicable.

FIG. 2 illustrates a relationship between an uplink frame and downlink frame in a wireless communication system to which a method described in the present disclosure is applicable.

As illustrated in FIG. 2, uplink frame number i for transmission from the user equipment (UE) should begin $T_{TA}$ = $N_{TA}T_S$ earlier than the start of the downlink frame by the UE.

For numerology μ, slots are numbered in ascending order of $n_s^\mu \in \{0,...,N_{subframe}^{slots,\mu} -1\}$ in the subframe and in ascending order of $n_{s,f}^\mu \in \{0,...,N_{frame}^{slots,\mu} -1\}$ in the radio frame. One slot includes consecutive OFDM symbols of $N_{symb}^\mu$ and $N_{symb}^\mu$ is determined according to the used numerology and slot configuration. In the subframe, the start of slot $n_s^\mu$ is temporally aligned with the start of $n_s^\mu N_{symb}^\mu$.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ slot of slots per radio frame, and the number $N_{slot}^{subframe,\mu}$ slot of slots per subframe in a normal CP. Table 4 represents the number of OFDM symbols per slot, the number of slots per radio frame, and the number of slots per subframe in an extended CP.

TABLE 3

| μ | $N_{slot}^{frame,\mu}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

Figure 3:
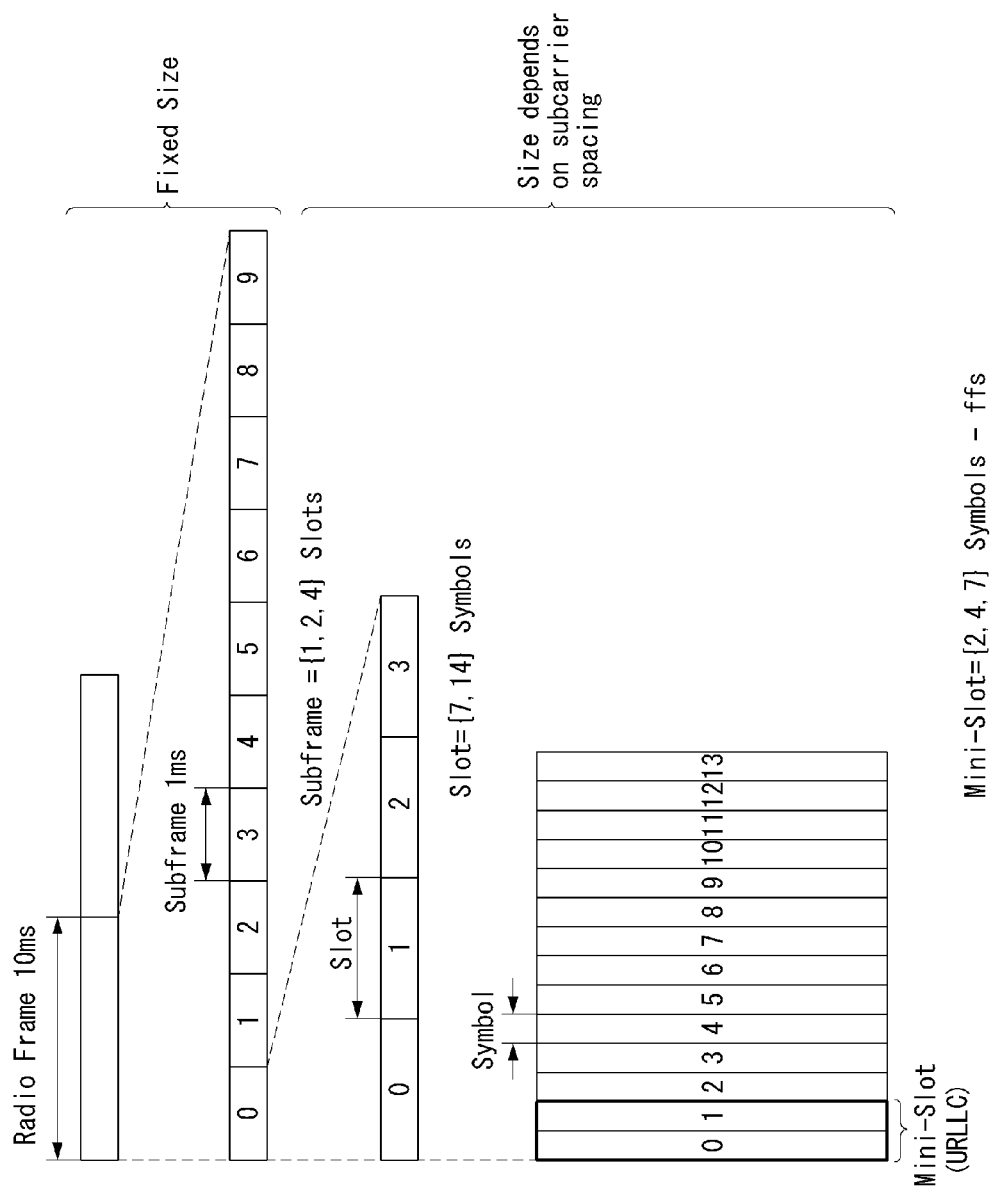
FIG. 3 illustrates an example of a frame structure in an NR system.

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe = {1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

Figure 4:
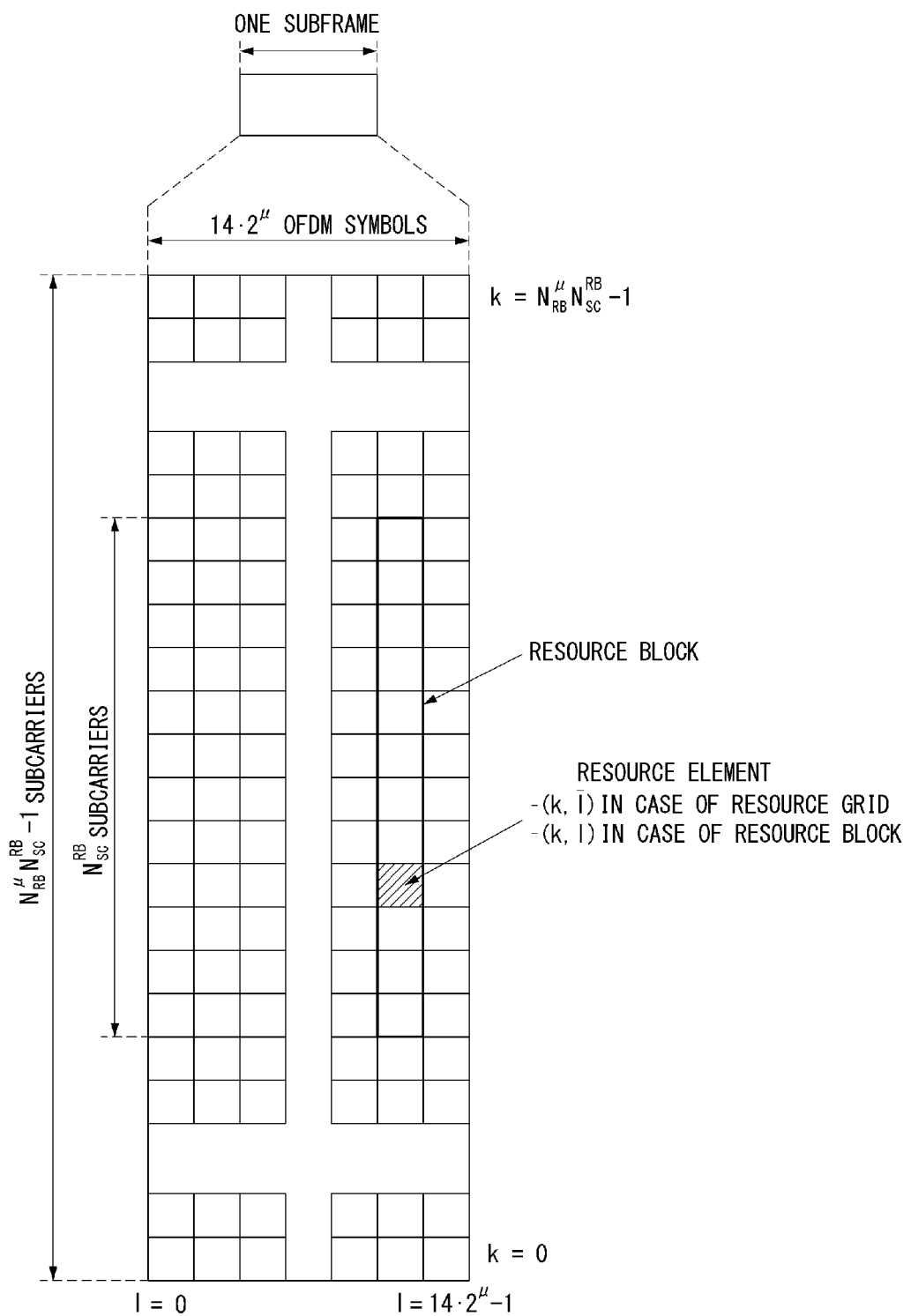
FIG. 4 illustrates an example of a resource grid supported by a wireless communication system to which a method proposed in the present disclosure is applicable.

FIG. 4 illustrates an example of a resource grid supported in a wireless communication system to which a method proposed in the present disclosure is applicable.

Referring to FIG. 4, a resource grid consists of $N_{RB}^\mu N_{sc}^{RB}$ subcarriers on a frequency domain, each subframe consisting of 14·2 μ OFDM symbols, but the present disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \leq N_{RB}^{max,\mu} N_{RB}^{max,\mu}$ denotes a maximum transmission bandwidth and may change not only between numerologies but also between uplink and downlink.

Figure 5:
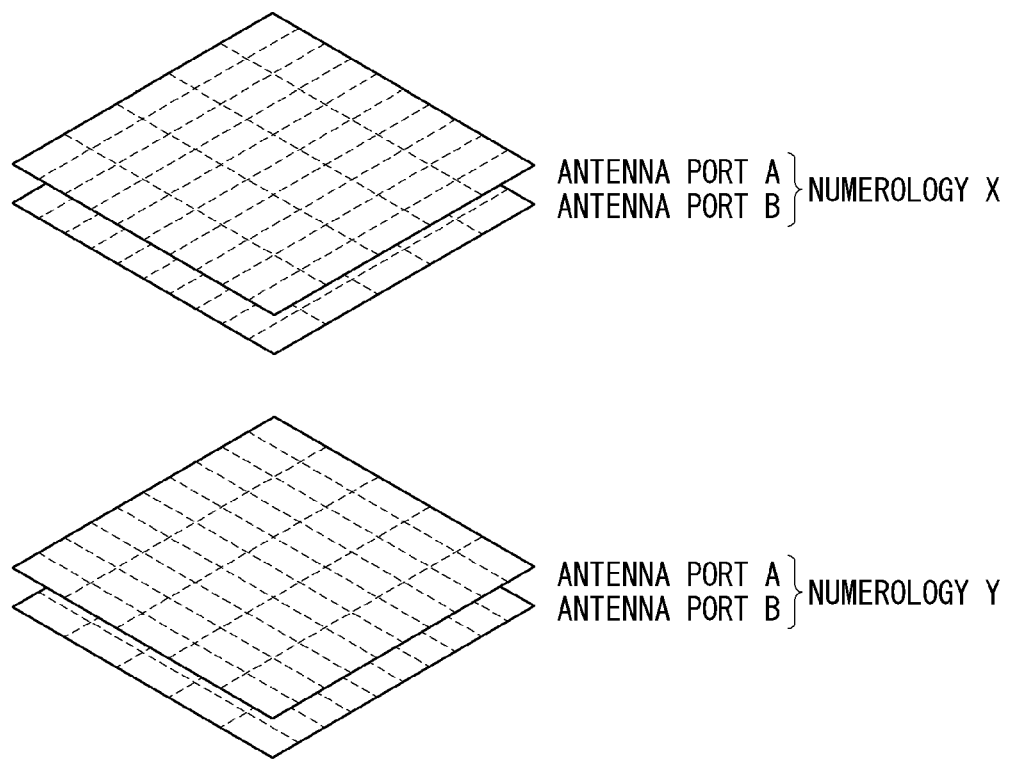
FIG. 5 illustrates examples of a resource grid for each antenna port and numerology to which a method proposed in the present disclosure is applicable.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k,l) where $k = 0,...,N_{RB}^\mu N_{sc}^{RB} -1$ is an index on a frequency domain, and $\bar{l} = 0,...,2^\mu N_{symb}^{(\mu)} -1$ refers to a location of a symbol in a subframe. The index pair (k,l) is used to refer to a resource element in a slot, where $l = 0,...,N_{symb}^\mu -1$.

The resource element (k,$\bar{l}$) for the numerology μ and the antenna port p corresponds to a complex value $a_{k,\bar{l}}^{(p,\mu)}$. When there is no risk for confusion or when a specific antenna port or numerology is not specified, the indexes p and μ may be dropped, and as a result, the complex value may be $a_{k,\bar{l}}^{(p)}$ or $a_{k,\bar{l}}$.

Further, a physical resource block is defined as $N_{sc}^{RB} = 12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^\mu$ in the frequency domain and resource elements (k, l) for the subcarrier spacing configuration μ may be given by the following Equation 1.

$$n_{CRB}^\mu = \left\lfloor \frac{k}{N_{sc}^{RB}} \right\rfloor \quad \text{[Equation 1]}$$

Here, k may be defined relative to the point A so that k = 0 corresponds to a subcarrier centered around the point A. Physical resource blocks are defined within a bandwidth part (BWP) and are numbered from 0 to $N_{BWP,i}^{size} -1$ where i is No. Of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, $N_{BWP,i}^{start}$ may be the common resource block where the BWP starts relative to the common resource block 0.

Physical Channel and General Signal Transmission

Figure 6:
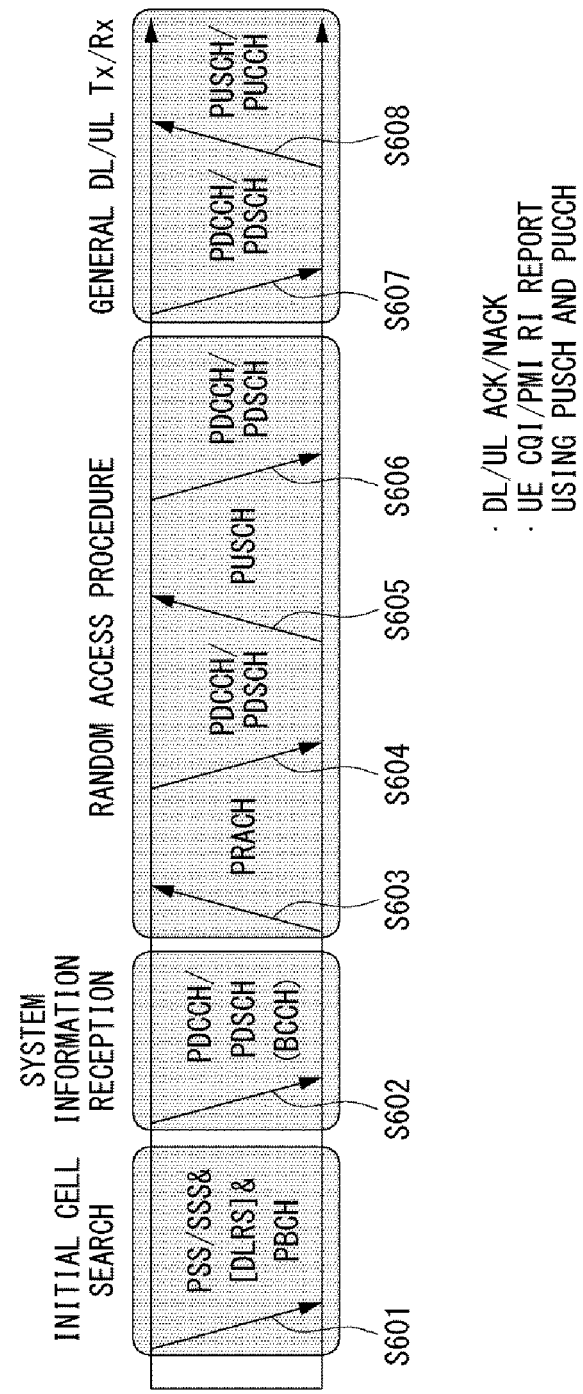
FIG. 6 illustrates physical channels and general signal transmission used in a 3GPP system.

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

When there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

The control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Opeation of measuring characteristics of a beam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS). Further, each BM procedure may include Tx beam sweeping for determining the Tx beam and Rx beam sweeping for determining the Rx beam.

Downlink Beam Management (DL BM)

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRT).

Figure 7:
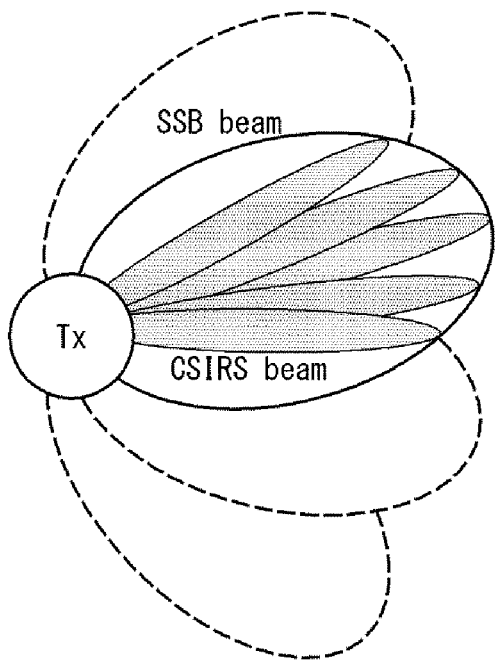
FIG. 7 illustrates an example of beamforming using SSB and CSI-RS.

FIG. 7 illustrates an example of beamforming using a SSB and a CSI-RS.

As illustrated in FIG. 7, a SSB beam and a CSI-RS beam may be used for beam measurement. A measurement metric is L1-RSRP per resource/block. The SSB may be used for coarse beam measurement, and the CSI-RS may be used for fine beam measurement. The SSB may be used for both Tx beam sweeping and Rx beam sweeping. The Rx beam sweeping using the SSB may be performed while the UE changes Rx beam for the same SSBRI across multiple SSB bursts. One SS burst includes one or more SSBs, and one SS burst set includes one or more SSB bursts.

DL BM Related Beam Indication

A UE may be RRC-configured with a list of up to M candidate transmission configuration indication (TCI) states at least for the purpose of quasi co-location (QCL) indication, where M may be 64.

Each TCI state may be configured with one RS set. Each ID of DL RS at least for the purpose of spatial QCL (QCL Type D) in an RS set may refer to one of DL RS types such as SSB, P-CSI RS, SP-CSI RS, A-CSI RS, etc.

Initialization/update of the ID of DL RS(s) in the RS set used at least for the purpose of spatial QCL may be performed at least via explicit signaling.

Table 5 represents an example of TCI-State IE.

The TCI-State IE associates one or two DL reference signals (RSs) with corresponding quasi co-location (QCL) types.

TABLE 5

```
-- ASN1START
--TAG-TCI-STATE-START

TCI-State    ::=          SEQUENCE {
    tci-StateId               TCI-State-Id
    qcl-Type1                 QCL-Info,
    qcl-Type2                 QCL-Info
    ...
}

QCL-Info    ::=          SEQUENCE {
    cell                      ServCellIndex
    bwp-Id                    BWP-Id
    referenceSignal           CHOICE {
        csi-rs                    NZP-CSI-RS-ResourceId,
        ssb                       SSB-Index
    ),
    qcl-Type                  ENUMERATED {typeA, typeB, typeC, typeD},
    ...
}

- - TAG-TCI-STATE-STOP
- - ASN1STOP
```

In Table 5, bwp-Id parameter represents a DL BWP where the RS is located, cell parameter represents a carrier where the RS is located, and reference signal parameter represents reference antenna port(s) which is a source of quasi co-location for corresponding target antenna port(s) or a reference signal including the one. The target antenna port(s) may be CSI-RS, PDCCH DMRS, or PDSCH DMRS. As an example, in order to indicate QCL reference RS information on NZP CSI-RS, the corresponding TCI state ID may be indicated to NZP CSI-RS resource configuration information. As another example, in order to indicate QCL reference information on PDCCH DMRS antenna port(s), the TCI state ID may be indicated to each CORESET configuration. As another example, in order to indicate QCL reference information on PDSCH DMRS antenna port(s), the TCI state ID may be indicated via DCI.

Quasi-Co Location (QCL)

The antenna port is defined so that a channel over which a symbol on an antenna port is conveyed may be inferred from a channel over which another symbol on the same antenna port is conveyed. When properties of a channel over which a symbol on one antenna port is conveyed may be inferred from a channel over which a symbol on another antenna port is conveyed, the two antenna ports may be considered as being in a quasi co-located or quasi co-location (QC/QCL) relationship.

The channel properties include one or more of delay spread, Doppler spread, frequency/Doppler shift, average received power, received timing/average delay, and spatial RX parameter. The spatial Rx parameter means a spatial (reception) channel property parameter such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability.

Each TCI-State contains parameters for configuring a quasi co-location relationship between one or two DL reference signals and the DM-RS ports of the PDSCH.

The quasi co-location relationship is configured by the higher layer parameter qcl-Type 1 for the first DL RS and qcl-Type2 for the second DL RS (if configured). For the case of two DL RSs, the QCL types are not be the same, regardless of whether the references are to the same DL RS or different DL RSs.

The quasi co-location types corresponding to each DL RS are given by the higher layer parameter qcl-Type of QCL-Info and may take one of the following values:
  'QCL-TypeA': {Doppler shift, Doppler spread, average delay, delay spread}
  'QCL-TypeB': {Doppler shift, Doppler spread}
  'QCL-TypeC': {Doppler shift, average delay }
  'QCL-TypeD': {Spatial Rx parameter}

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZ P CSI-RS reception.

The UE may receive an activation command by MAC CE signaling used to map up to eight TCI states to the codepoint of the DCI field 'Transmission Configuration Indication'.

UL BM Procedure

A UL BM may be configured such that beam reciprocity (or beam correspondence) between Tx beam and Rx beam is established or not established depending on the UE implementation. If the beam reciprocity between Tx beam and Rx beam is established in both a base station and a UE, a UL beam pair may be adjusted via a DL beam pair. However, if the beam reciprocity between Tx beam and Rx beam is not established in any one of the base station and the UE, a process for determining the UL beam pair is necessary separately from determining the DL beam pair.

Even when both the base station and the UE maintain the beam correspondence, the base station may use a UL BM procedure for determining the DL Tx beam even if the UE does not request a report of a (preferred) beam.

The UM BM may be performed via beamformed UL SRS transmission, and whether to apply UL BM of a SRS resource set is configured by the (higher layer parameter)

usage. If the usage is set to 'BeamManagement (BM)', only one SRS resource may be transmitted to each of a plurality of SRS resource sets in a given time instant.

The UE may be configured with one or more sounding reference symbol (SRS) resource sets configured by (higher layer parameter) SRS-ResourceSet (via higher layer signaling, RRC signaling, etc.). For each SRS resource set, the UE may be configured with K≥1 SRS resources (higher later parameter SRS-resource), where K is a natural number, and a maximum value of K is indicated by SRS capability.

In the same manner as the DL BM, the UL BM procedure may be divided into a UE's Tx beam sweeping and a base station's Rx beam sweeping.

Figure 8A:
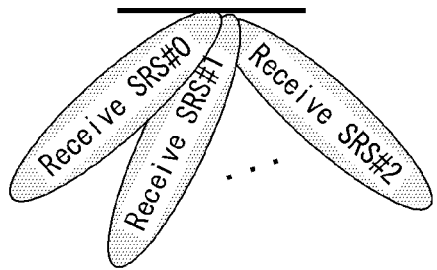
FIGS. 8A and 8B illustrate an example of a UL BM procedure using an SRS.
Figure 8A:
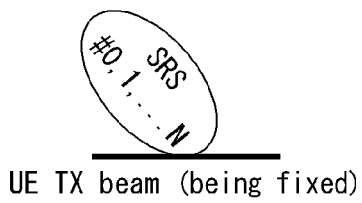
Figure 8B:
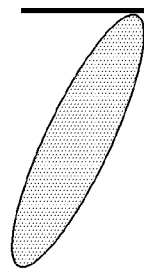
Figure 8B:
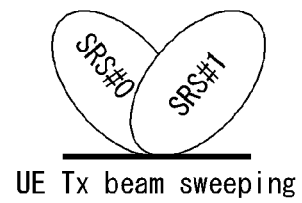

FIGS. 8A and 8B illustrate an example of a UL BM procedure using a SRS.

More specifically, FIG. 8A illustrates an Rx beam determination procedure of a base station, and FIG. 8B illustrates a Tx beam sweeping procedure of a UE.

Figures 9, 10:
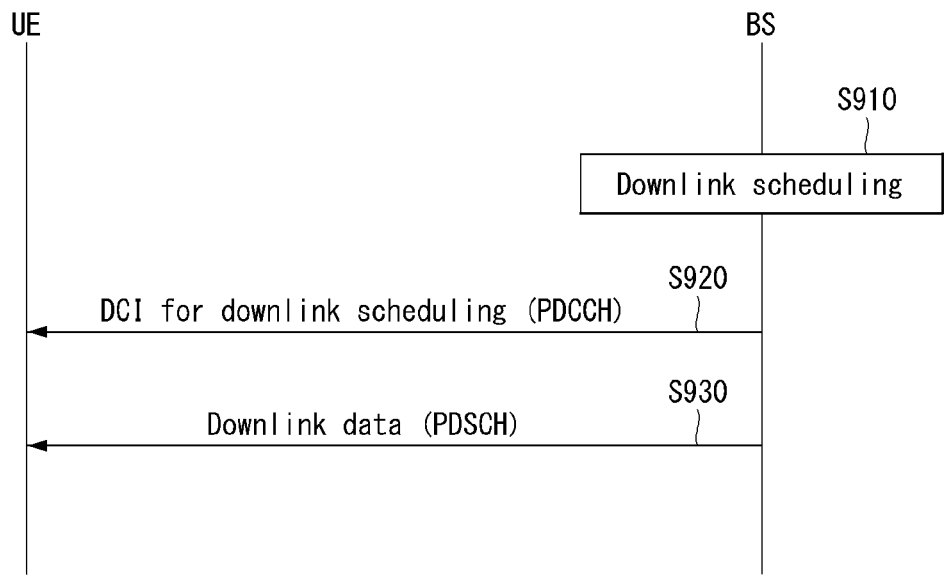
FIG. 9 illustrates an example of downlink transmission/reception operation.
FIG. 10 illustrates an MAC CE related to TCI state activation to which a method described in the present disclosure is applicable.

FIG. 9 illustrates an example of downlink transmission/reception operation.

A base station may schedule downlink transmission such as frequency/time resources, a transport layer, a downlink precoder, MCS, and the like (S910). As an example, the base station may determine a beam for transmitting a PDSCH to a UE.

The UE may receive downlink control information (DCI: Downlink Control Information) for downlink scheduling (i.e., including scheduling information of the PDSCH) on a PDCCH from the base station (S920).

DCI format 1_0 or DCI format 1_1 may be used for downlink scheduling, and DCI format 1_1 may include the following information. For example, DCI format 1_1 may include at least one of a DCI format identifier, a bandwidth part indicator, frequency domain resource assignment, time domain resource assignment, a PRB bundling size indicator, a rate matching indicator, ZP CSI-RS trigger, antenna port(s), transmission configuration indication (TCI), an SRS request, and demodulation reference signal (DMRS) sequence initialization.

In particular, the number of DMRS ports can be scheduled, and SU (single-user) / MU (multi- user) transmission scheduling can be performed according to each state indicated in the antenna port(s) field.

In addition, the TCI field consists of 3 bits, and the QCL for the DMRS may be dynamically indicated by indicating a maximum of 8 TCI states according to the TCI field value.

The UE may receive downlink data from the base station on the PDSCH (S930).

When the UE detects a PDCCH including DCI format 1_0 or 1_1, the UE may decode the PDSCH according to an indication by the corresponding DCI. Here, when the UE receives a PDSCH scheduled by DCI format 1, the UE may set a DMRS configuration type by a higher layer parameter 'dmrs-Type', and the DMRS type is used to receive the PDSCH. In addition, the UE may set the maximum number of DMRS symbols front-loaded for the PDSCH by a higher layer parameter 'maxLength'.

In the case of DMRS configuration type 1, when a single codeword is scheduled for the UE and an antenna port mapped with an index of {2, 9, 10, 11 or 30} is specified, or two codewords are scheduled for the UE, the UE assumes that all remaining orthogonal antenna ports are not associated with PDSCH transmission to another UE. In the case of DMRS configuration type 2, if a single codeword is scheduled for the UE and an antenna port mapped with an index of {2, 10 or 23} is specified, or if two codewords are scheduled for the UE, the UE assumes that all the remaining orthogonal antenna ports are not associated with PDSCH transmission to another UE.

When the UE receives the PDSCH, it may assume precoding granularity P' to be consecutive resource blocks in the frequency domain. Here, P' may correspond to one of {2, 4, broadband}. If P' is determined to be wideband, the UE does not expect to be scheduled with non-contiguous PRBs and the UE may assume that the same precoding is applied to allocated resources. On the other hand, if P' is determined as any one of {2, 4}, a precoding resource block group (PRG) is divided into P' consecutive PRBs. The actual number of consecutive PRBs in each PRG may be one or more. The UE may assume that the same precoding is applied to consecutive downlink PRBs in the PRG.

In order for the UE to determine a modulation order, a target code rate, and a transport block size in the PDSCH, the UE may first read a 5-bit MCD field in the DCI and determine the modulation order and the target code rate. Then, the UE may read a redundancy version field in the DCI and determine a redundancy version. In addition, the UE may determine the transport block size using the number of layers and the total number of allocated PRBs before rate matching.

The contents (3GPP system, frame structure, NR system, etc.) described above can be applied by being combined with methods to be described later in the present disclosure, or can be supplemented to clarify technical features of methods described in the present disclosure. Methods to be described below are distinguished merely for convenience of description. Therefore, it is obvious that partial configuration of any one method can be replaced by partial configuration of another method, or methods can be combined and applied.

In a current scheme in which up to 128 RRC-configurable candidate TCI states (as a candidate pool) are RRC-configurable per CC/BWP, 8 TCI states among them are activated (down-selected) by MAC CE and are mapped to "Transmission Configuration Indication" of DCI, and then one of the 8 TCI states is dynamically indicated upon the subsequent PDSCH scheduling, the up to 128 RRC-configured candidate TCI states are independently RRC-configured per individual CC and per specific BWP within the individual CC as described above, and a subsequent MAC CE activation message is also sent per individual CC and per specific BWP within the individual CC. For example, even in the case of a system (so-called "one beam system") that intends to commonly apply only a single beam (or single TCI state information) for all the configured CCs/BWPs, there is a disadvantage in that the same controlling message should be unnecessarily repeatedly transmitted across multiple configured CCs/BWPs. According to the current Rel-15 NR CA standard, since the UE can be configured with up to 32 CCs, the above situation may be seen as having a very large unnecessary control signaling overhead.

The contents (3GPP system, frame structure, NB-IoT system, etc.) described above can be applied by being combined with methods to be described later in the present disclosure, or can be supplemented to clarify technical features of methods described in the present disclosure.

First, through the following operation in the current MAC standard (3GPP TS 38.321), there is supported a feature in which up to 8 TCI states in an RRC-configurable TCI-state pool (up to 128 TCI states) per bandwidth part (BWP) per component carrier (CC) are mapped to 'Transmission Configuration Indication' of DL DCI through MAC-CE based activation, and one of the up to 8 TCI states is dynamically selected (i.e., dynamic TCI/beam selection for PDSCH) upon the subsequent DCI-based DL scheduling.

With reference to FIG. 10, matters related to activation/deactivation of a transmission configuration indicator (TCI) state are described below.

FIG. 10 illustrates an MAC CE related to TCI state activation to which a method described in the present disclosure is applicable.

The TCI state activation/deactivation for UE-specific PDSCH MAC CE is identified by a MAC PDU subheader with a specified logical channel ID (LCID). With reference to FIG. 10, the UE-specific PDSCH MAC CE has a variable size consisting of following fields.

Serving Cell ID: This field indicates the ID of the serving cell for which the MAC CE applies. The length of the field is 5 bits.

BWP ID: This field indicates a DL BWP for which the MAC CE applies as the codepoint of the DCI bandwidth part indicator field. The length of the BWP ID field is 2 bits.

Ti: If there is a TCI state in which an ID of the TCI state is i (i.e., with TCI-StateId i), this field indicates the activation/deactivation status of the TCI state with TCI-StateId i, otherwise (if there is no TCI state with TCI-StateId i) MAC entity shall ignore the $T_i$ field.

The $T_i$ field is set to "1" to indicate that the TCI state with TCI-StateId i is activated and mapped to the codepoint of the DCI Transmission Configuration Indication field. The $T_i$ field is set to "0" to indicate that the TCI state with TCI-StateId i is deactivated and is not mapped to the codepoint of the DCI Transmission Configuration Indication field. The codepoint to which the TCI state is mapped is determined by its ordinal position among all the TCI states with $T_i$ field set to "1". That is, the first TCI state with $T_i$ field set to "1" is mapped to the codepoint value0. The second TCI State with $T_i$ field set to "1" is mapped to the codepoint value 1. The maximum number of activated TCI states is 8.

R: Reserved Bit, Set to "0"

As described above, the application of up to 8 TCI states activated by MAC-CE signaling may be based on the Transmission Configuration Indication field of DL DCI. An operation related to the TCI field of the DL DCI may be performed based on the Quasi-Co Location (QCL) related contents and DCI format 1_1. This is described in detail below.

The UE may be configured with a list of up to M TCI-State configurations within the higher layer parameter PDSCH-Config to decode PDSCH according to a detected PDCCH with DCI intended for the UE and the given serving cell, where M depends on the UE capability.

Each TCI-State contains parameters for configuring a quasi co-location relationship between one or two DL reference signals and the DM-RS ports of the PDSCH.

Each TCI-State contains parameters for configuring a quasi co-location (QCL) relationship between one or two DL reference signals and the DM-RS ports of the PDSCH, the DM-RS port of PDCCH or the CSI-RS port of a CSI-RS resource. The quasi co-location relationship is configured by the higher layer parameter qcl-Type1 for the first DL RS and qcl-Type2 for the second DL RS (if configured). For the case of two DL RSs, the QCL types are not the same, regardless of whether the references are to the same DL RS or different DL RSs.

The quasi co-location types corresponding to each DL RS are given by the higher layer parameter qcl-Type in QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay }
'QCL-TypeD': {Spatial Rx parameter}

The UE receives an activation command used to map up to 8 TCI states to the codepoints of the DCI field 'Transmission Configuration Indication'. When the HARQ-ACK corresponding to the PDSCH carrying the activation command is transmitted in slot n, the (indicated) mapping between TCI states and codepoints of the DCI field 'Transmission Configuration Indication' should be applied starting from the first slot that is after slot $n + 3N_{slot}^{subframe,\mu}$.

After a UE receives an initial higher layer configuration of TCI states and before reception of the activation command, the UE may assume that the DM-RS ports of PDSCH of a serving cell are quasi co-located with the SS/PBCH block determined in the initial access procedure with respect to 'QCL-TypeA' (when applicable, also with respect to 'QCL-TypeD').

Matters related to DCI format 1_1 is described below.

DCI format 1_1 is used for the scheduling of PDSCH in one cell.

DCI foramt 1_1 includes a field (transmission configuration indication field) for indicating any one of the activated TCI states.

Transmission configuration indication: 0 bit if higher layer parameter tci-PresentInDCI is not enabled; otherwise (if higher layer parameter tci-PresentInDCI is enabled) 3 bits.

The UE may operate as follows in relation to the transmission configuration indication (TCI) field.

1) If the "Bandwidth part indicator" field indicates a bandwidth part other than the active bandwidth part, 2) if the higher layer parameter tci-PresentInDCI is not enabled for the control resource set (CORESET) used for the PDCCH carrying the DCI format 1_1, 3) the UE assumes tci-PresentInDCI is not enabled for all CORESETs in the indicated bandwidth part.

2) otherwise (i.e., if the higher layer parameter tci-PresentInDCI is enabled for the control resource set (CORESET) used for the PDCCH carrying the DCI format 1_1), 3) the UE assumes tci-PresentInDCI is enabled for all CORESETs in the indicated bandwidth part.

An operation related to the TCI state activation based on the existing method as above is performed as follows.

Up to 128 candidate TCI states as a candidate pool are configurable per component carrier (CC)/bandwidth part (BWP). The configuration may be performed via RRC.

8 TCI states among them are activated (down-selected) by MAC CE and are mapped to a "Transmission Configuration Indication" field of DCI. Afterward, one of the activated TCI states is dynamically indicated upon the subsequent PDSCH scheduling.

According to the existing method as above, the configuration of the up to 128 (RRC-configured) candidate TCI states is independently configured per individual CC (and per specific BWP within the individual CC) (via RRC), and a subsequent MAC CE activation message is also sent per individual CC (and per specific BWP within the individual CC).

However, the existing method has the following problem.

Specifically, for example, in the case of a system (so-called "one beam system") in which only one beam (or one TCI state information) is commonly managed (applied) for all the configured CCs/BWPs, the same controlling message should be unnecessarily repeatedly transmitted across multiple configured CCs/BWPs. That is, the existing method has a disadvantage in that the same controlling message should be unnecessarily repeatedly transmitted.

Since the UE can be configured with up to 32 component carriers (CCs), the UE may cause a very large unnecessary control signaling overhead if the TCI states are activated according to the existing method.

To solve the above problem, the following details have been agreed in relation to a basic operation to enable simultaneously/at once/commonly the activations of up to 8 MAC-CE-activated TCI-states for PDSCH for multiple CCs/BWPs via a single MAC CE message.

The following agreement is related to simultaneous TCI states activation/selection across multiple CCs/BWPs.

For latency/overhead reduction across multiple CCs/BWPs, a method of supporting single MAC-CE to activate the same set of PDSCH TCI state IDs for multiple CCs/BWPs may be considered.

Example 1: Through the reuse of Rel-1 5 MAC-CE, the same set of TCI state IDs for all active BWPs in same band or cell group on FR2 may be activated.

Support of this mode can be indicated by UE capability.

To operate in this mode, the UE expects that the same QCL-TypeD RS is configured for the same TCI state ID for all active BWPs in each band or cell group(s).

For activation MAC-CE received on any active BWP in a band or cell group(s), indicated activated TCI state IDs are applied to all active BWPs in the corresponding band or cell group(s).

Example 2: Through the reuse of Rel-15 MAC-CE, one set of TCI state IDs (including both QCL Type-A and QCL Type-D RSs) for an active BWP of the CC indicated by the MAC-CE may be activated. The MAC-CE is applied to all active BWPs in the same band or cell group on FR2.

Note: The QCL Type A RS(s) applied to each CC/BWP is that corresponding to the same resource ID(s) indicated by the TCI state IDs. That is, the QCL Type A RS(s) applied to each CC/BWP may be indicated by the resource ID(s).

There is a need to determine operation/signaling details including the possibility to activate different sets of PDSCH TCI state IDs for multiple CCs/BWPs.

Note: QCL type-A comes from the BWP where the TCI state is applied.

As described above, it is agreed to support a single MAC-CE can activate at least the same set of PDSCH TCI state IDs for multiple CCs/BWPs for latency/overhead reduction across multiple CCs/BWPs.

The Examples 1 and 2 are similar, and the main difference considered in the Example 2 is based on the linkage with the same ID criterion to determine QCL Type-A RS.

That is, according to the current standard, source/reference of QCL Type-D (for spatial QCL) attribute configurable for a specific target RS within a specific BWP supports to be able apply "cross-CC/BWP QCL association/signaling" from different CCs/BWPs. However, source/reference of QCL Type-A or Type-B or Type-C attribute configurable for the specific target RS within the specific BWP cannot apply "cross-CC/BWP QCL association/signaling" from different CCs/BWPs, and only a specific RS within the BWP configured with only the target RS may be source/reference.

The present disclosure proposes the following operation.

It would be more preferable if the single MAC CE message can carry a flexible combination of CCs/BWPs by allowing a simple concatenation of the applied list of CCs/BWPs inside the MAC CE message. This can achieves huge overhead reduction compared to the existing MAC CE message format that only carries (TCI state activation related to) one CC/BWP at a time delivered by a separate PDSCH.

Since the Examples 1 and 2 can be regarded as a special case of the suggested concatenation based method, the suggested concatenation based method seems sufficient and more desired in terms of the flexibility and overhead reduction trade-off.

Proposal 1

As described above, considering the flexibility and overhead reduction trade-off, a concatenation of the applied list of CCs/BWPs inside the MAC CE message may be considered to activate the same set of PDSCH TCI state IDs.

As an embodiment of the proposed operation, the following structure may be considered.

For the simultaneous TCI states activation for PDSCH, the concatenated CCs/BWPs commonly applied by a single MAC CE message may be considered. This is described below with reference to FIG. 11.

Figure 11:
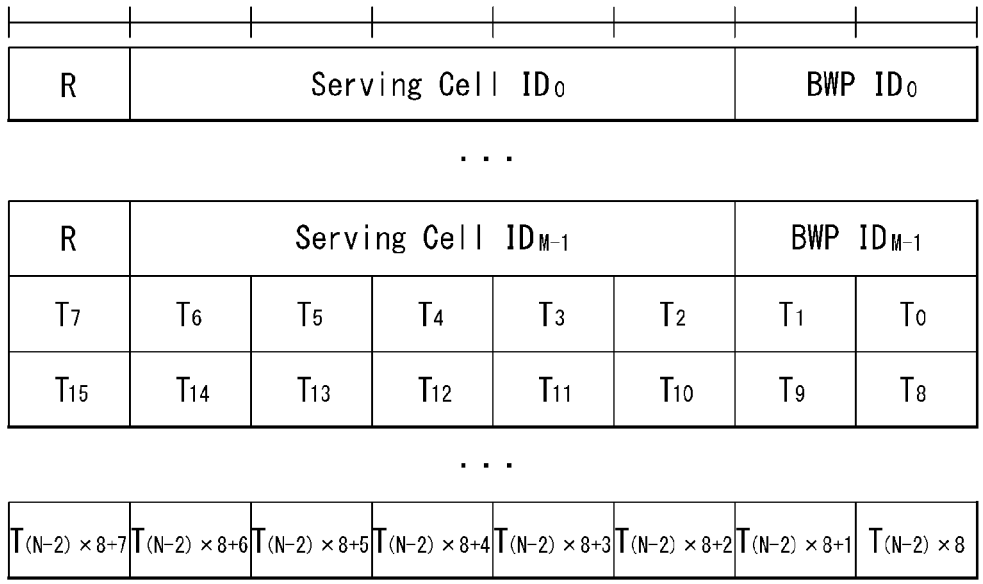
FIG. 11 illustrates an MAC CE message for TCI state activation/deactivation to which a method described in the present disclosure is applicable.

FIG. 11 illustrates an MAC CE message for TCI state activation/deactivation to which a method described in the present disclosure is applicable. More specifically, FIG. 11 illustrates a UE-specific PDSCH MAC CE.

Referring to FIG. 11, a base station may signal a list of M CCs (and BWPs according to the M CCs) in a concatenated form. The M value may be indicated together via the MAC CE message. For example, a separate bitwidth for signaling of the M value is configured, and if this value is first decoded, list information of subsequent M CCs (and BWPs according to the M CCs) may be decoded.

As another method, as illustrated in FIG. 11, 'R' (Reserved bit) of 1 bit may be present in front of a part indicating each CC ID and BWP ID, and the base station may inform a UE of information related to the M value in a kind of "toggling" form using this. For example, 1) if 'R' = 1, it may be defined as a flag notifying a state in which a next row (for CC ID and BWP ID) is also present, and an operation for continuously decoding next CC ID and BWP ID information may be applied. 2) If a value of 'R' existing in front of any specific row (for CC ID and BWP ID) is signaled as 'R' = 0, an operation may be defined/configured so that the specific row (for CC ID and BWP ID) is recognized to correspond to a last row of the concatenated CCs/BWPs list.

As another example, the M value may be provided via separate RRC (and/or MAC CE) configuration. In other words, the base station may configure, to the UE, a list of M CCs (and BWPs according to the M CCs) related to the simultaneous TCI state activation via RRC signaling.

It should be appreciated that various modifications that allow the M value (i.e., M CCs/BWPs list) to be recognized through the above-described embodiments are included in the spirit of the present disclosure.

In this instance, the TCI states based on the list of M CCs/BWPs may be activated (by the MAC CE message) based on the following i) or ii).

i) In the MAC CE message, a part (or field) indicating activation/deactivation of each TCI state subsequent to concatenated CCs/BWPs part to apply the MAC CE message may be based on the existing format. That is, the TCI states related to the activation/deactivation may be expressed as 'T0, T1, ..., T(N-2)x8-1-7' in the MAC CE message. '(N-2)x8+7 may be based on higher layer parameter 'maxNrofTCI-States-1'. That is, the same set of TCI states activated for the concatenated CCs/BWPs may be commonly applied.

ii) In the MAC CE message, a part (or field) indicating activation/deactivation of each TCI state (e.g., T0, T1, ... T(N-2)x8+7 described above) may not indicate single information (the same set of TCI states described above). Specifically, the part (or field) indicating activation/deactivation of each TCI state may include information related to activation/deactivation of independent/different TCI states (predefined/pre-configured) per applied CCs/BWPs (or per a subset of applied CCs/BWPs). As above, (the existing field inside) the MAC CE message may be extended and applied.

For example, the MAC CE message may include as much TCI state activation/deactivation related information as the number of concatenated CCs/BWPs to be configured via the MAC CE message.

And/or, the concatenated CCs/BWPs may be configured based on the following restriction. Specifically, the concatenated CCs/BWPs (serving-cell IDs) may be configured based on a restriction to be based on a combination of only intra-band CCs. This is to prevent the same set of TCI states from being commonly activated since a frequency spacing greatly increases between CCs beyond intra-band (i.e., inter-band CCs).

Through the above-described proposal, there is an effect of flexibly designating CCs/BWPs to which the simultaneous TCI states activation is applied. And/or, to efficiently designate the CCs/BWPs to be applied, a pre-defined/pre-configured list of CCs/BWPs may be separately configured/designated and applied.

Proposal 1-1

A base station may configure n candidate CCs/BWPs for CCs/BWPs for activation/deactivation of TCI states and indicate one CC/BWP among the n configured candidate CCs/BWPs.

Specifically, the base station may pre-configure combinations of CCs/BWPs (or sets of CCs/BWPs) for the purpose of TCI states activation/deactivation as n candidates (e.g., combination 0 to combination n-1, or set 0 to set n-1) via separate RRC signalling.

The base station may indicate one combination of CCs/BWPs via a specific bit field of a (single) MAC CE message. The specific bit field (X bit field) may indicate one combination of CCs /BWPs among the n configured candidates. For example, X may be based on $\log_2 n$. More specifically, X may be one of 1, 2, 3, 4, 5, 6, 7 or 8.

A method of performing simultaneous TCI states activation/deactivation for the combination of CCs/BWPs may be considered. That is, the one combination of CCs/BWPs may include list information of the M CCs (and/or corresponding BWPs) described above, and a network (base station) may indicate the M CCs (and/or corresponding BWPs) via the X bit field without the need to list the M CCs (and/or corresponding BWPs) on the MAC CE message and may update the TCI states.

Such an operation has advantages of reducing an overhead of the MAC CE message and considering flexibility by pre-configuring the n combinations of CCs/BWPs.

Figure 12:
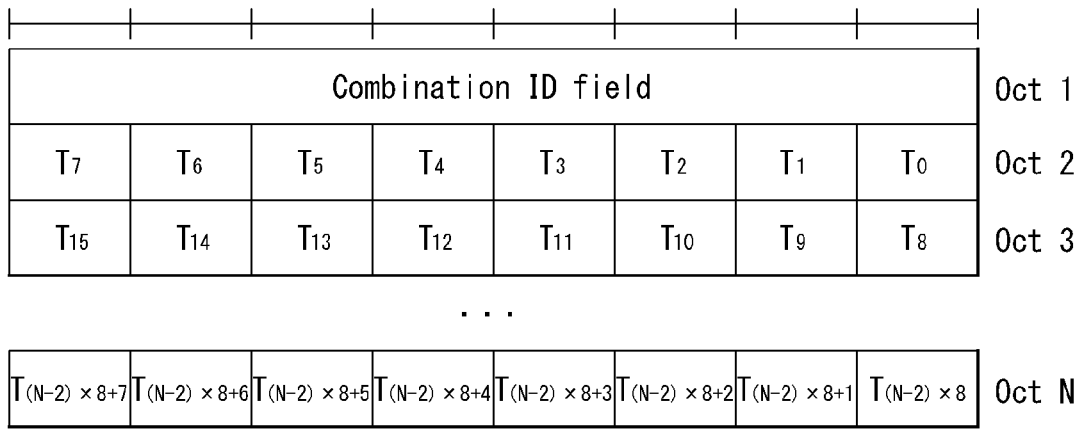
FIG. 12 illustrates an MAC CE according to an embodiment of the present disclosure.

For example, it may be assumed that the number of possible combinations is 8 (i.e., n=8). First, the base station may pre-configure the 8 combinations of CCs/BWPs (or sets of CCs/BWPs) (e.g., combination index 0 to combination index 7, or set 0 to set 7) via RRC signalling. Afterwards, the base station may construct MAC signaling in the form of including 3 bit field (i.e., $\log_2 8$ bit field) and a part (or field) indicating activation/deactivation of each TCI state) (e.g., T0, T1, ... T(N-2)x8+7 of the existing standard) in the (single) MAC CE message. The base station may indicate a specific combination of CCs/BWPs (combination index and/or set index) of the 8 combinations via the (single) MAC CE message and may perform the TCI states activation/deactivation. For example, the MAC-CE may be configured as illustrated in FIG. 12. FIG. 12 illustrates an MAC CE according to an embodiment of the present disclosure. Referring to FIG. 12, a combination ID field may indicate one combination of CCs/BWPs of the n configured combinations of CCs/BWPs.

The combination of CCs/BWPs may consist of CCs/BWPs in the same band or intra-band, or may consist of inter-band CCs/BWPs.

The combination may consist of only CCs, or consist of only BWPs. For example, i combinations consist of CCs, and the base station can perform TCI States Activation/Deactivation for one combination of CCs among the i combinations through Y bit field (e.g., Y = $\log_2 i$ /Y is one of 1, 2, 3, 4, 5, 6, 7 and 8) and a part (or field) indicating TCI state activation/deactivation via the (single) MAC CE message.

If a specific combination is indicated as the case in which a combination consists of only CCs, the UE may operate as follows.

The UE may perform i) TCI States Activation/Deactivation for all BWPs in the CCs of the combination, or ii) TCI States Activation/Deactivation for only active BWPs in the CCs of the combination.

Alternatively, the base station may RRC-configure a combination including both the CCs/BWPs in the same manner as the n combinations, and then indicate TCI States Activation/Deactivation for one combination of CCs/BWPs among the n combinations through Z bit field (e.g., Z=, $\log_2 n$ / Z is one of 1, 2, 3, 4, 5, 6, 7 and 8) and a part (or field) indicating TCI state activation/deactivation in the (single) MAC CE message.

In relation to the MAC CE configuration in the proposal 1-1, in addition to a field related to the combination ID (e.g., combination ID field of FIG. 12), the MAC CE message may also be configured to additionally include W bit (e.g., W = 1, i.e., flag bit) indicating (in the toggling form) whether or not the MAC CE message is for the simultaneous TCI States Activation/Deactivation.

For example, in addition to a combination ID field of Oct 1 of FIG. 12, the MAC CE message may additionally include information (e.g., 1 bit field) representing/indicating whether it relates to TCI states update for a single CC/BWP or simultaneous TCI states update for multiple CCs/BWPs. The information may be positioned at the MSB or LSB side of the Oct 1. That is, the information and the combination ID field may be configured to be included in the Oct 1 together, and the information may be positioned at the MSB/LSB side.

The following needs to be clearly determined in relation to the above-described embodiments and functions. Specifically, there is a need to clearly determine whether the RRC configurable number of TCI states (up to 128) is still different and independent across the considered CCs/BWPs.

Proposal 2 is described in detail below.

Proposal 2

It would be unnecessarily restrictive if the RRC-configurable number of TCI states per CCs/BWPs shall also be the same. The main motivation of the simultaneous TCI state activation feature is to significantly reduce redundant higher layer signalling overhead. It can be attainable for a part of RRC-configured TCI state IDs which are the common part of the whole considered CCs/BWPs for the simultaneous TCI state activation. If the indication of activated TCI state IDs is not fully belonging to such a common part, this indication should only be applied for the target CC/BWP as a default behaviour. That the indication is not fully belonging to the common part may mean that all the indicated TCI state IDs are not included in the common part. In other words, that the indication is not fully belonging to the common part may mean that the common part does not include the indicated TCI state IDs or includes only some of the indicated TCI state IDs.

A behavior according to the proposal 2 is described in detail below.

For example, in a state where TCI states for CC1, CC2 and CC3 (BWPs according to the CCs) are configured via RRC as below, the behavior according to the proposal 2 may be performed as follows.

For CC1, 100 TCI states are configured (TCI-state ID#1 to TCI-state ID#100)

For CC2, 50 TCI states are configured (TCI-state ID#1 to TCI-state ID#50)

For CC3, 100 TCI states are configured (TCI-state ID#1 to TCI-state ID#100)

In this case, a common part for CC1, CC2 and CC3 is TCI-state ID#1 to TCI-state ID#50.

Example 1) If the MAC CE message (single MAC CE message) is transmitted from CC1 and thus a set of indicated TCI-states is TCI state IDs #42, #44, #46, #48, #52, #54, #56, and #58, (simultaneous) TCI state activation may be applied only to CC1. This is because the set of indicated TCI-states does not fully overlap configured TCI-state IDs of CC2. That is, since all the indicated TCI-states (42, 44, 46, 48, 52, 54, 56, and 58) are not included in the common part (TCI state IDs #1 to #50), TCI state activation via the MAC CE message is applied only to CC1.

Example 2) If the MAC CE message (single MAC CE message) is transmitted from the CC1 and thus a set of indicated TCI-states is TCI state IDs #12, #14, #16, #18, #22, #24, #26, and #28, (simultaneous) TCI state activation may be applied to all the CC1, CC2 and CC3. This is because the set of indicated TCI-states fully overlaps configured TCI-state IDs of CC1, CC2 and CC3. That is, since all the indicated TCI-states (12, 14, 16, 18, 22, 24, 26, and 28) are included in the common part (TCI state IDs #1 to #50), TCI state activation via the MAC CE message can be applied to CC2 and CC3 as well as CC1.

As another method described in the present disclosure, simultaneous TCI state activation may be performed only for (a set of) CCs/BWPs meeting conditions of the common part. Specifically, in the same case as the Example 1), (simultaneous) TCI state activation may be applied to CC3 as well as CC1. Although the indicated TCI state IDs (# 42, 44, 46, 48, 52, 54, 56, and 58) do not fully overlap configured TCI state IDs of CC2, CC1 and CC3 fully overlap TCI state IDs (#1 to 100) configured on the CC1 and CC3. The CC1 and CC3 meet the conditions of the common part. Accordingly, it may be defined/configured/indicated that (simultaneous) TCI state activation is limitedly applied only for a set of CCs/BWPs meeting the conditions of the common part.

That is, according to the above-described proposed operation, a range of CCs/BWPs to which activation of (a set of) TCI states indicated by the MAC CE message is applied may be limited as follows.

The activation of (a set of the indicated TCI states may be applied for CCs/BWPs in which TCI state IDs (RRC-configured TCI states IDs) configured on the CC includes all of a set of the indicated TCI state IDs.

In addition, for example, CCs/BWPs to which the activation of (a set of) the indicated TCI states is applied may be previously stipulated (e.g., via separate RRC signalling, etc.) (e.g., CCs/BWPs in an intra-band and/or in cell group(s)), and the above-described operation may be performed for CCs/BWPs meeting the above conditions within the pre-stipulated/pre-configured CCs/BWPs.

Proposal 3

In the same case as the Example 1), simultaneous TCI state activation may be performed in a range in which a set of TCI state IDs indicated per each CC/BWP overlap.

Specifically, if the MAC CE message (single MAC CE message) is transmitted from CC1 and thus a set of indicated TCI-states is TCI state IDs #42, #44, #46, #48, #52, #54, #56, and #58, (simultaneous) TCI states activation may be fully applied only to CC1 and CC3, and may be applied for overlapping TCI-state IDs (i.e., IDs # 42, 44, 46, and 48) in CC2.

That is, TCI state IDs configured on CC2 may not include all the set of indicated TCI-states (#ID 42, 44, 46, 48, 52, 54, 56, and 58), but the TCI states may be activated in the overlapping/including range (#ID 42, 44, 46, and 48).

In the above case, only TCI-state IDs #42, 44, 46, and 48 in CC2 may be activated via the MAC CE message and may be mapped to a 'Transmission Configuration Indication' field of DL DCI for PDSCH.

And/or, a process of mapping the "TCI-state IDs #42, 44, 46, and 48" to a state indicated by the 'Transmission Configuration Indication' field (of a fixed bit-width) may be based on a specific rule/pattern. The "TCI-state IDs #42, 44, 46, and 48" may be sequentially/cyclically mapped to each state indicated by the TCI field of DL DCI based on the specific rule/pattern.

For example, in the case of 3-bit 'Transmission Configuration Indication' field, the "TCI-state IDs #42, 44, 46, and 48" to be mapped may be sequentially mapped per each field state in ascending order (or descending order). If there is more field state to be mapped, the process of repeatedly mapping the TCI-state IDs may be performed again. The corresponding operation is illustrated as follows.

For the CC2, TCI-state (#IDs 42, 44, 46, 48) may be mapped to states ('000' to '111') indicated by the 3-bit Transmission Configuration Indication field as follows.

'000': TCI state ID# 42
'001': TCI-state ID# 44
'010': TCI-state ID# 46
'011': TCI-state ID# 48
'100': TCI-state ID# 42
'101': TCI-state ID# 44
'110': TCI-state ID# 46
'111': TCI-state ID# 48

For the CC1 and the CC3, TCI-state (#IDs 42, 44, 46, 48, 52, 54, 56, 58) may be mapped to states ('000' to '111') indicated by the 3-bit Transmission Configuration Indication field as follows.

'000': TCI state ID# 42
'001': TCI-state ID# 44
'010': TCI-state ID# 46
'011': TCI-state ID# 48
'100': TCI-state ID# 52
'101': TCI-state ID# 54
'110': TCI-state ID# 56
'111': TCI-state ID# 58

The UE operation related to the above-described embodiments may be performed in the following order.

The capability reporting including the matters related to the UE capability on "supporting a single MAC-CE to activate at least the same set of PDSCH TCI state IDs for multiple CCs/BWPs"

the UE is configured with the RRC-configured candidate TCI states from the base station the UE receives, from the base station, the proposed MAC CE message (enhanced MAC-CE signalling with concatenated CCs/BWPs to be commonly applied for simultaneous TCI states activation for PDSCH)

the UE determines simultaneous TCI states activation based on the TCI-state ID if a set of TCI-states activated per multiple CCs/BWPs are differently configured e.g.,: if TCI-state IDs are fully overlapped, simultaneous TCI states activation is applied e.g.,: if TCI-state IDs are partially overlapped, it is applied to overlapped TCI-state ID the UE maps it to 'Transmission Configuration Indication' field of DL-related DCI the UE applies dynamically indicated TCI state among them upon subsequent PDSCH scheduling and receives PDSCH The BS operation related to the above-described embodiments may be performed in the following order.

The base station receives the capability reporting including the matters related to the UE capability on "supporting a single MAC-CE to activate at least the same set of PDSCH TCI state IDs for multiple CCs/BWPs"

the base station configures the RRC-configured candidate TCI states to the UE the base station transmits, to the UE, the proposed MAC CE message (enhanced MAC-CE signalling with concatenated CCs/BWPs to be commonly applied for simultaneous TCI states activation for PDSCH)

the base station prepares subsequent DL scheduling in a state of mapping TCI states indicated via the MAC CE message to 'Transmission Configuration Indication' of DL-related DCI the base station applies dynamically indicated TCI state among them upon subsequent PDSCH scheduling to assume that the UE will receive PDSCH and transmits the generated PDSCH to the UE If a communication device to which the above-described embodiment is applied is the UE, the following operation may be performed.

A processor may perform the capability reporting including the matters related to the UE capability on "supporting a single MAC-CE to activate at least the same set of PDSCH TCI state IDs for multiple CCs/BWPs" on the base station through a transceiver. The processor may be configured with the RRC-configured candidate TCI states from the base station through the transceiver.

The processor may receive the proposed MAC CE message (enhanced MAC-CE signalling with concatenated CCs/BWPs to be commonly applied for simultaneous TCI states activation for PDSCH) from the base station through the transceiver.

The processor may map TCI states activated based on the MAC CE message to 'Transmission Configuration Indication' of DL-related DCI.

The processor may apply dynamically indicated TCI state among them upon subsequent PDSCH scheduling and receive PDSCH from the base station through the transceiver.

If a communication device to which the above-described embodiment is applied is the base station, the following operation may be performed.

A processor may receive the capability reporting including the matters related to the UE capability on "supporting a single MAC-CE to activate at least the same set of PDSCH TCI state IDs for multiple CCs/BWPs" from the UE through a transceiver.

The processor may configure the RRC-configured candidate TCI states to the UE through the transceiver.

The processor may transmit the proposed MAC CE message (enhanced MAC-CE signalling with concatenated CCs/BWPs to be commonly applied for simultaneous TCI states activation for PDSCH) to the UE through the transceiver.

The processor may prepare subsequent DL scheduling in a state of mapping TCI states via the MAC CE message to 'Transmission Configuration Indication' of DL-related DCI.

The processor may apply dynamically indicated TCI state among them upon subsequent PDSCH scheduling to assume that the UE will receive PDSCH and transmit the generated PDSCH to the UE through the transceiver.

In terms of implementation, the UE/BS operations according to the above-described embodiments (e.g., operations related to TCI state activation based on at least one of the proposal 1, the proposal 1-1, the proposal 2, and the proposal 3) may be processed by a device of FIGS. 16 to 20 to be described later (e.g., processors 102 and 202 of FIG. 17).

Figure 17:
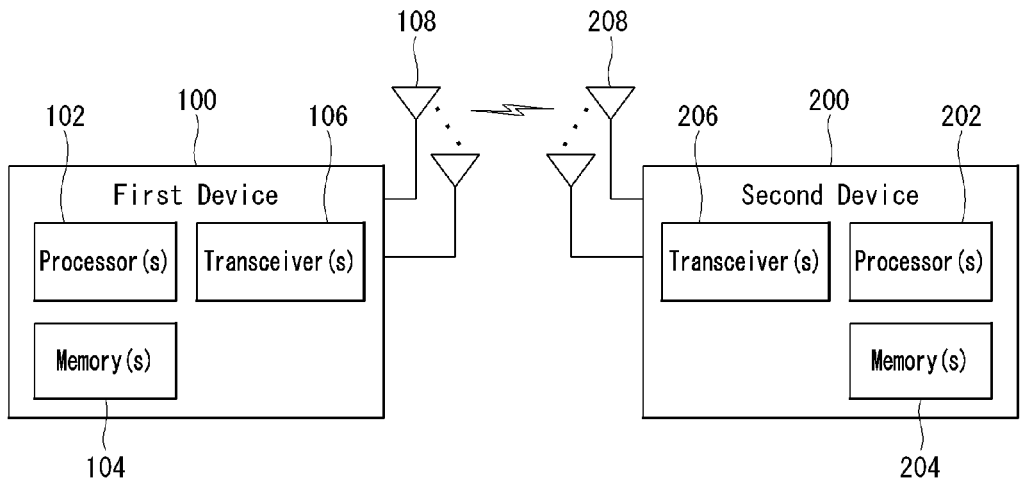
FIG. 17 illustrates wireless devices applicable to the present disclosure.

In addition, the UE/BS operations according to the above-described embodiments (e.g., operations related to TCI state activation based on at least one of the proposal 1, the proposal 1-1, the proposal 2, and the proposal 3) may be stored in a memory (e.g., 104 and 204 of FIG. 17) in the form of a command/program (e.g., instruction, executable code) for running at least one processor (e.g., 102 and 202 of FIG. 17).

Figure 13:
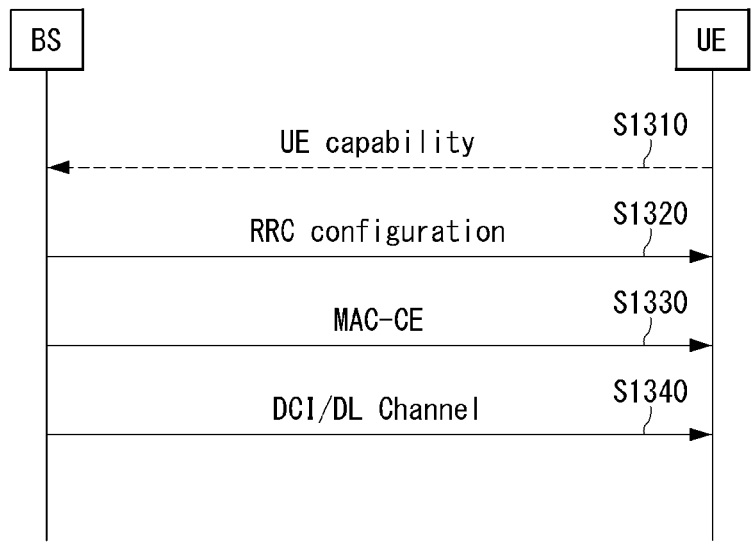
FIG. 13 illustrates an example of signaling between a UE and a base station to which a method described in the present disclosure is applicable.

FIG. 13 illustrates an example of signaling between a UE and a base station to which a method described in the present disclosure is applicable. More specifically, FIG. 13 illustrates an example of signaling between a base station (BS) and a user equipment (UE) for performing DL transmission/reception across multiple CCs/BWPs to which methods (e.g., the proposal 1/proposal 1-1/proposal 2/proposal 3, etc. ) described in the present disclosure are applicable.

In the present disclosure, the UE/BS are merely an example and may be replaced by various devices to be described below with reference to FIGS. 16 to 20. FIG. 13 is merely for convenience of description and does not limit a scope of the present disclosure. Further, some step(s) illustrated in FIG. 13 may be omitted depending on situation and/or setting, etc.

UE Operation

A UE may transmit UE capability information to a BS, in S1310. For example, the UE may transmit, to the BS, the UE capability information related to the above-described proposed methods (e.g., the proposal 1/proposal 1-1/proposal 2/proposal 3, etc.). As an example, the UE capability information may include information related to whether an MAC-CE for TCI state activation/deactivation is supported. As an example, the UE capability information may include information for/related to the number of combinations of CCs/BWPs (or sets of CCs/BWPs) that the UE can support. As an example, the MAC-CE may correspond to a (single) MAC-CE for activating the same set of PDSCH TCI state IDs for multiple CCs/BWPs.

For example, an operation of the UE (100/200 of FIGS. 16 to 20) in the step S1310 to transmit the UE capability information to the BS (100/200 of FIGS. 16 to 20) may be implemented by a device of FIGS. 16 to 20 to be described below. For example, referring to FIG. 17, one or more processors 102 may control one or more transceivers 106 and/or one or more memories 104 so as to transmit the UE capability information, and the one or more transceivers 106 may transmit the UE capability information to the BS.

The UE may receive RRC configuration information from the BS, in S1320. The RRC configuration information may include configuration information related to TCI state(s)/DL (e.g., PDSCH PDCCH, etc.) transmission related configuration information, etc. The RRC configuration information may include one or multiple configurations and may be transmitted via UE-specific RRC signaling. For example, the RRC configuration information may include RRC configuration, etc. described in the above-described proposed methods (e.g., the proposal 1/proposal 1-1/proposal 2/proposal 3, etc.). As an example, the RRC configuration information may include information related to candidate TCI states. For example, the candidate TCI states may be differently configured per CC/BWP. As an example, the RRC configuration information may include information for/related to candidates of combination (or set) of CCs/BWPs related to (simultaneous) TCI states Activation/Deactivation (e.g., list information for the combination (or set) of CCs/BWPs).

For example, an operation of the UE (100/200 of FIGS. 16 to 20) in the step S1320 to receive the RRC configuration information from the BS (100/200 of FIGS. 16 to 20) may be implemented by the device of FIGS. 16 to 20 to be described below. For example, referring to FIG. 17, one or more processors 102 may control one or more transceivers 106 and/or one or more memories 104 so as to receive the RRC configuration information, and the one or more transceivers 106 may receive the RRC configuration information from the BS.

The UE may receive an MAC-CE from the BS, in S1330. For example, the MAC-CE may include indication information, etc. described in the above-described proposed methods (e.g., the proposal 1/proposal 1-1/proposal 2/proposal 3, etc.). As an example, information for concatenation of the multiple CCs/BWPs may be received via the MAC-CE. For example, TCI state activation may be simultaneously performed on the multiple CCs/BWPs to which the concatenation is applied. As an example, the MAC-CE may include information related to the TCI state activation. For example, the TCI state activation may vary per CC/BWP. For example, if simultaneous TCI states activation is performed for the multiple CCs/BWPs, the UE may operate considering an activated TCI state ID in each CC/BWP. As an example, the MAC-CE may include a specific bit field (e.g., $X = \log_2 n$, where X is one of 1, 2, 3, 4, 5, 6, 7, and 8) indicating any one combination (or set) of CCs/BWPs among candidates of combination (or set) of CCs/BWPs configured via the RRC configuration information. For example, the MAC-CE may additionally include information representing/indicating whether the MAC-CE is related to TCI states update for a single CC/BWP or simultaneous TCI states update for the multiple CCs/BWPs, in addition to the specific bit field indicating/related to the combination (or set) of CCs/BWPs.

For example, an operation of the UE (100/200 of FIGS. 16 to 20) in the step S1330 to receive the MAC-CE from the BS (100/200 of FIGS. 16 to 20) may be implemented by the device of FIGS. 16 to 20 to be described below. For example, referring to FIG. 17, one or more processors 102 may control one or more transceivers 106 and/or one or more memories 104 so as to receive the MAC-CE, and the one or more transceivers 106 may receive the MAC-CE from the BS.

The UE may receive DCI/DL channel from the BS (i.e., perform DL reception) based on the RRC configuration information and/or the MAC-CE, in S1340. The DL channel may include PDCCH/PDSCH, etc. For example, the UE may receive the DCI/DL channel based on the above-described proposed methods (e.g., the proposal 1/proposal 1-1/proposal 2/proposal 3, etc.). For example, the DCI may include information (e.g., transmission configuration indication) for dynamically selecting one of multiple TCI states. For example, the UE may receive the PDSCH based on the dynamically indicated TCI state via the DCI.

For example, an operation of the UE (100/200 of FIGS. 16 to 20) in the step S1340 to perform the DL reception from the BS (100/200 of FIGS. 16 to 20) may be implemented by the device of FIGS. 16 to 20 to be described below. For example, referring to FIG. 17, one or more processors 102 may control one or more transceivers 106 and/or one or more memories 104 so as to perform the DL reception, and the one or more transceivers 106 perform the DL reception for the BS.

BS Operation

A BS may receive UE capability information from a UE, in S1310. For example, the BS may receive, from the UE, the UE capability information related to the above-described proposed methods (e.g., the proposal 1/proposal 1-1/proposal 2/proposal 3, etc.). As an example, the UE capability information may include information related to whether an MAC-CE for TCI state activation/deactivation is supported. As an example, the UE capability information may include information for/related to the number of combinations of CCs/BWPs (or sets of CCs/BWPs) that the UE can support. As an example, the MAC-CE may correspond to a (single) MAC-CE for activating the same set of PDSCH TCI state IDs for multiple CCs/BWPs.

For example, an operation of the BS (100/200 of FIGS. 16 to 20) in the step S1310 to receive the UE capability information from the UE (100/200 of FIGS. 16 to 20) may be implemented by a device of FIGS. 16 to 20 to be described below. For example, referring to FIG. 17, one or more processors 202 may control one or more transceivers 206 and/or one or more memories 204 so as to receive the UE capability information, and the one or more transceivers 206 may receive the UE capability information from the UE.

The BS may transmit RRC configuration information to the UE, in S1320. The RRC configuration information may include configuration information related to TCI state(s)/DL (e.g., PDSCH/PDCCH, etc.) transmission related configuration information, etc. The RRC configuration information may include one or multiple configurations and may be transmitted via UE-specific RRC signaling. For example, the RRC configuration information may include RRC configuration, etc. described in the above-described proposed methods (e.g., the proposal 1/proposal 1-1/proposal 2/proposal 3, etc.). As an example, the RRC configuration information may include information related to candidate TCI states. For example, the candidate TCI states may be differently configured per CC/BWP. As an example, the RRC configuration information may include information for/related to candidates of combination (or set) of CCs/BWPs related to (simultaneous) TCI states Activation/Deactivation (e.g., list information for the combination (or set) of CCs/BWPs).

For example, an operation of the BS (100/200 of FIGS. 16 to 20) in the step S1320 to transmit the RRC configuration information to the UE (100/200 of FIGS. 16 to 20) may be implemented by the device of FIGS. 16 to 20 to be described below. For example, referring to FIG. 17, one or more processors 202 may control one or more transceivers 206 and/or one or more memories 204 so as to transmit the RRC configuration information, and the one or more transceivers 206 may transmit the RRC configuration information to the UE.

The BS may transmit an MAC-CE to the UE, in S1330. For example, the MAC-CE may include indication information, etc. described in the above-described proposed methods (e.g., the proposal 1/proposal 1-1/proposal 2/proposal 3, etc.). As an example, information for concatenation of the multiple CCs/BWPs may be received via the MAC-CE. For example, TCI state activation may be simultaneously performed on the multiple CCs/BWPs to which the concatenation is applied. As an example, the MAC-CE may include information related to the TCI state activation. For example, the TCI state activation may vary per CC/BWP. For example, if simultaneous TCI states activation is performed for the multiple CCs/BWPs, the BS may operate considering an activated TCI state ID in each CC/BWP. As an example, the MAC-CE may include a specific bit field (e.g., $X = \log_2 n$, where X is one of 1, 2, 3, 4, 5, 6, 7, and 8) indicating any one combination (or set) of CCs/BWPs among candidates of combination (or set) of CCs/BWPs configured via the RRC configuration information. For example, the MAC-CE may additionally include information representing/indicating whether the MAC-CE is related to TCI states update for a single CC/BWP or simultaneous TCI states update for the multiple CCs/BWPs, in addition to the specific bit field indicating/related to the combination (or set) of CCs/BWPs.

For example, an operation of the BS (100/200 of FIGS. 16 to 20) in the step S1330 to transmit the MAC-CE to the UE (100/200 of FIGS. 16 to 20) may be implemented by the device of FIGS. 16 to 20 to be described below. For example, referring to FIG. 17, one or more processors 202 may control one or more transceivers 206 and/or one or more memories 204 so as to transmit the MAC-CE, and the one or more transceivers 206 may transmit the MAC-CE to the UE.

The BS may transmit DCI/DL channel to the UE (i.e., perform DL transmission) based on the RRC configuration information and/or the MAC-CE, in S1340. The DL channel may include PDCCH/PDSCH, etc. For example, the BS may transmit the DCI/DL channel based on the above-described proposed methods (e.g., the proposal 1/proposal 1-1/proposal 2/proposal 3, etc.). For example, the DCI may include information (e.g., transmission configuration indication) for dynamically selecting one of multiple TCI states. For example, the dynamically indicated TCI state may be applied to the PDSCH transmitted by the BS based on the DCI.

For example, an operation of the BS (100/200 of FIGS. 16 to 20) in the step S1340 to perform the DL transmission to the UE (100/200 of FIGS. 16 to 20) may be implemented by the device of FIGS. 16 to 20 to be described below. For example, referring to FIG. 17, one or more processors 202 may control one or more transceivers 206 and/or one or more memories 204 so as to perform the DL transmission, and the one or more transceivers 106 perform the DL transmission for the UE.

As mentioned above, the above-described BS/UE signaling and operation (e.g., the proposal 1/proposal 1-1/proposal 2/proposal 3/FIG. 13, etc.) may be implemented by a device to be described below (e.g., X1 to X9). For example, the UE may correspond to a first wireless device, and the BS may correspond to a second wireless device. In some cases, the reverse may also be considered.

For example, the above-described BS/UE signaling and operation (e.g., the proposal 1/proposal 1-1/proposal 2/proposal 3/FIG. 13, etc.) may be processed by one or more processors (e.g., 102 and 202) of FIGS. 16 to 20. The above-described BS/UE signaling and operation (e.g., the proposal 1/proposal 1-1/proposal 2/proposal 3/FIG. 13, etc.) may be stored in a memory (e.g., one or more memories 104 and 204 of FIG. 17) in the form of a command/program (e.g., instruction, executable code) for running at least one processor (e.g., 102 and 202) of FIGS. 16 to 20.

Effects according to embodiments of the present disclosure are summarized as follows. When a single beam (or single TCI state information) is commonly utilized for multiple configured CCs/BWPs (e.g., one beam system), repeated transmission of the control signal can be prevented. Further, since TCI states can be simultaneously activated on CCs/BWPs, the system can be operated more efficiently.

The embodiments described above are described from a UE operation perspective in detail below with reference to FIG. 14. Methods to be described below are distinguished merely for convenience of description. Therefore, it is obvious that partial configuration of any one method can be replaced by partial configuration of another method, or methods can be combined and applied.

Figure 14:
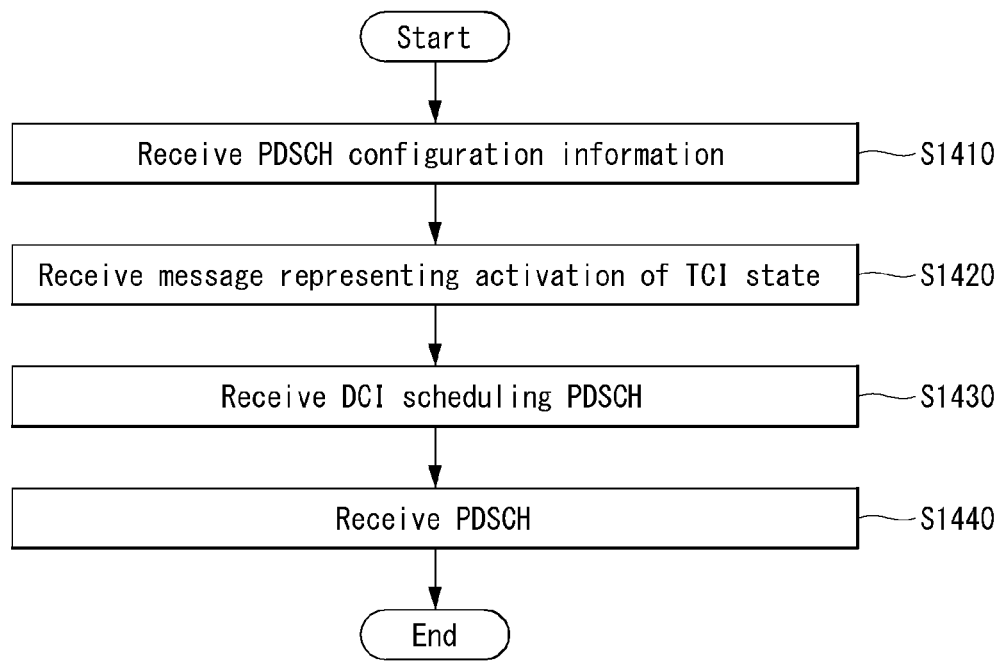
FIG. 14 is a flow chart illustrating a method of receiving, by a UE, a physical downlink shared channel in a wireless communication system according to an embodiment of the present disclosure.

FIG. 14 is a flow chart illustrating a method of receiving, by a UE, a physical downlink shared channel in a wireless communication system according to an embodiment of the present disclosure.

Referring to FIG. 14, a method of receiving, by a UE, a physical downlink shared channel in a wireless communication system according to an embodiment of the present disclosure comprises a step S1410 of receiving PDSCH configuration information, a step S1420 of receiving a message representing activation of a TCI state, a step S1430 of receiving DCI scheduling the PDSCH, and a step S1440 of receiving the PDSCH.

In the step S1410, the UE receives, from a base station, configuration information related to a physical downlink shared channel (PDSCH).

According to the step S1410, an operation of the UE (100/200 of FIGS. 16 to 20) to receive the configuration information related to the PDSCH from the base station (100/200 of FIGS. 16 to 20) may be implemented by a device of FIGS. 16 to 20. For example, referring to FIG. 17, one or more processors 102 may control one or more transceivers 106 and/or one or more memories 104 so as to receive the configuration information related to the PDSCH from the base station 200.

In the step S1420, the UE receives, from the base station, a message representing activation of a transmission configuration indicator (TCI) state related to the PDSCH.

According to an embodiment, specific frequency domains related to the activation may be determined based on the message. The TCI states activated by the message may be related to the specific frequency domains. The present embodiment may be based on the proposal 1.

The specific frequency domains may be based on at least one of component carriers (CCs) or bandwidth parts (BWPs).

The specific frequency domains may be based on a list which is pre-configured via higher layer signaling. The pre-configured list may be based on a list including M CCs/BWPs in the proposal 1.

According to an embodiment, the message may be based on a medium access control-control element (MAC CE).

According to an embodiment, the pre-configured list may be based on one of a plurality of candidate lists. The present embodiment may be based on the proposal 1-1. The plurality of candidate lists may be based on n candidate CCs/BWPs in the proposal 1-1.

According to an embodiment, the message may represent specific TCI states, and the activated TCI states may be based on the specific TCI states and may be related to all or some of the specific frequency domains. The present embodiment may be based on the proposal 2.

Based on TCI states configured in the specific frequency domains fully overlapping the specific TCI states, respectively, the specific TCI states may be activated for the specific frequency domains.

Based on TCI states configured in one frequency domain of the specific frequency domains partially overlapping the specific TCI states, the specific TCI states may be activated for a frequency domain related to a transmission of the message among the specific frequency domains.

The above-described embodiments assume a case in which CC1, CC2 and CC3 are configured to the UE and the TCI state is configured to each CC as follows, as in the proposal 2, and the case is described in detail below.

For CC1, 100 TCI states are configured (TCI-state ID#1 to TCI-state ID#100),

For CC2, 50 TCI states are configured (TCI-state ID#1 to TCI-state ID#50),

For CC3, 100 TCI states are configured (TCI-state ID#1 to TCI-state ID#100)

If the message is transmitted via CC1 and the specific TCI states are based on TCI state IDs (#1, 2, 4, 5, 21, 22, 24, 2 5), TCI states (#1 to #100, #1 to #50, # 1 to #100) configured in the specific frequency domains CC1, CC2 and CC3 fully overlap the specific TCI states (#1, 2, 4, 5, 21, 22, 24, 25), respectively. Hence, the specific TCI states (#1, 2, 4, 5, 21, 22, 24, 25) can be activated for the specific frequency domains CC1, CC2 and CC3.

If the message is transmitted via CC1 and the specific TCI states are based on TCI state IDs (#1, 2, 4, 5, 51, 52, 54, 55), the TCI states (#1 to #50) configured in one frequency domain CC2 of the specific frequency domains CC1, CC2 and CC3 partially overlap the specific TCI states (#1, 2, 4, 5, 51, 52, 54, 55). Hence, the specific TCI states (#1, 2, 4, 5, 51, 52, 54, 55) can be activated for the frequency domain CC1 related to the transmission of the message among the specific frequency domains CC1, CC2 and CC3. In this case, this is the same as the operation according to the existing method.

According to an embodiment, the message represents specific TCI states, and the activated TCI states may be based on all or some of the specific TCI states. The present embodiment may be based on the proposal 3.

For a frequency domain configured with TCI states including all the specific TCI states among the specific frequency domains, all the specific TCI states may be activated.

For a frequency domain configured with TCI states including some of the specific TCI states among the specific frequency domains, some of the specific TCI states may be activated.

The above-described embodiments assume a case in which CC1, CC2 and CC3 are configured to the UE and the TCI state is configured to each CC as follows, and the case is described in detail below.

For CC1, 100 TCI states are configured (TCI-state ID#1 to TCI-state ID#100), For CC2, 50 TCI states are configured (TCI-state ID#1 to TCI-state ID#50), For CC3, 100 TCI states are configured (TCI-state ID#1 to TCI-state ID#100)

It may be assumed that the message is transmitted via CC1 and the specific TCI states are based on TCI state IDs (#1, 2, 4, 5, 51, 52, 54, 55).

For the frequency domains CC1 and CC3 configured with TCI states (#1 to 100 and #1 to 100) including all (#1, 2, 4, 5, 51, 52, 54, 55) the specific TCI states among the specific frequency domains CC1, CC2 and CC3, all the specific TCI states may be activated.

For the frequency domain CC2 configured with TCI states (#1 to 50) including some (#1,2,4,5) of the specific TCI states among the specific frequency domains CC1, CC2 and CC3, some of the specific TCI states may be activated.

According to an embodiment, if the activated TCI states are based on some of the specific TCI states, some of the specific TCI states may be mapped to a plurality of states related to a transmission configuration indication field of the DCI based on a pre-configured pattern. The present embodiment may be based on the proposal 3.

The pre-configured pattern may be a pattern in which some of the specific TCI states are repeated in a specific order based on the TCI state ID.

According to the step S1420, an operation of the UE (100/200 of FIGS. 16 to 20) to receive the message representing the activation of the TCI state related to the PDSCH from the base station (100/200 of FIGS. 16 to 20) may be implemented by the device of FIGS. 16 to 20. For example, referring to FIG. 17, one or more processors 102 may control one or more transceivers 106 and/or one or more memories 104 so as to receive the message representing the activation of the TCI state related to the PDSCH from the base station 200.

In the step S1430, the UE receives, from the base station, downlink control information (DCI) scheduling the PDSCH. The DCI represents one TCI state of the TCI states activated by the message.

According to the step S1430, an operation of the UE (100/200 of FIGS. 16 to 20) to receive the DCI scheduling the PDSCH from the base station (100/200 of FIGS. 16 to 20) may be implemented by the device of FIGS. 16 to 20. For example, referring to FIG. 17, one or more processors 102 may control one or more transceivers 106 and/or one or more memories 104 so as to receive the DCI scheduling the PDSCH from the base station 200.

In the step S1440, the UE receives the PDSCH from the base station based on the DCI.

According to the step S1440, an operation of the UE (100/200 of FIGS. 16 to 20) to receive the PDSCH from the base station (100/200 of FIGS. 16 to 20) based on the DCI may be implemented by the device of FIGS. 16 to 20. For example, referring to FIG. 17, one or more processors 102 may control one or more transceivers 106 and/or one or more memories 104 so as to receive the PDSCH from the base station 200 based on the DCI.

The embodiments described above are described from a BS operation perspective in detail below with reference to FIG. 15. Methods to be described below are distinguished merely for convenience of description. Therefore, it is obvious that partial configuration of any one method can be replaced by partial configuration of another method, or methods can be combined and applied.

Figure 15:
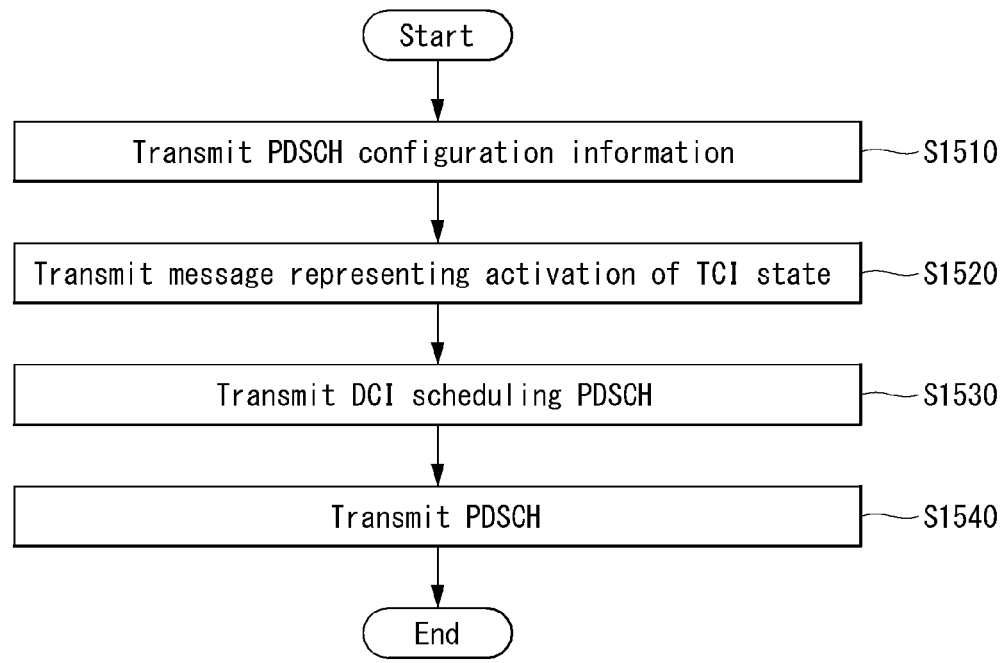
FIG. 15 is a flow chart illustrating a method of transmitting, by a base station, a physical downlink shared channel in a wireless communication system according to another embodiment of the present disclosure.

FIG. 15 is a flow chart illustrating a method of transmitting, by a base station, a physical downlink shared channel in a wireless communication system according to another embodiment of the present disclosure.

Referring to FIG. 15, a method of transmitting, by a base station, a physical downlink shared channel in a wireless communication system according to an embodiment of the present disclosure comprises a step S1510 of transmitting PDSCH configuration information, a step S1520 of transmitting a message representing activation of a TCI state, a step S1530 of transmitting DCI scheduling the PDSCH, and a step S1540 of transmitting the PDSCH.

In the step S1510, the base station transmits, to a UE, configuration information related to a physical downlink shared channel (PDSCH).

According to the step S1510, an operation of the base station (100/200 of FIGS. 16 to 20) to transmit the configuration information related to the PDSCH to the UE (100/200 of FIGS. 16 to 20) may be implemented by a device of FIGS. 16 to 20. For example, referring to FIG. 17, one or more processors 202 may control one or more transceivers 206 and/or one or more memories 204 so as to transmit the configuration information related to the PDSCH to the UE 100.

In the step S1520, the base station transmits, to the UE, a message representing activation of a transmission configuration indicator (TCI) state related to the PDSCH.

According to an embodiment, specific frequency domains related to the activation may be determined based on the message. The TCI states activated by the message may be related to the specific frequency domains. The present embodiment may be based on the proposal 1.

The specific frequency domains may be based on at least one of component carriers (CCs) or bandwidth parts (BWPs).

The specific frequency domains may be based on a list which is pre-configured via higher layer signaling. The pre-configured list may be based on a list including M CCs/BWPs in the proposal 1.

According to an embodiment, the message may be based on a medium access control-control element (MAC CE).

According to an embodiment, the pre-configured list may be based on one of a plurality of candidate lists. The present embodiment may be based on the proposal 1-1. The plurality of candidate lists may be based on n candidate CCs/BWPs in the proposal 1-1.

According to an embodiment, the message may represent specific TCI states, and the activated TCI states may be based on the specific TCI states and may be related to all or some of the specific frequency domains. The present embodiment may be based on the proposal 2.

Based on TCI states configured in the specific frequency domains fully overlapping the specific TCI states, respectively, the specific TCI states may be activated for the specific frequency domains.

Based on TCI states configured in one frequency domain of the specific frequency domains partially overlapping the specific TCI states, the specific TCI states may be activated for a frequency domain related to a transmission of the message among the specific frequency domains.

The above-described embodiments assume a case in which CC1, CC2 and CC3 are configured to the UE and the TCI state is configured to each CC as follows, as in the proposal 2, and the case is described in detail below.

For CC1, 100 TCI states are configured (TCI-state ID#1 to TCI-state ID#100),

For CC2, 50 TCI states are configured (TCI-state ID#1 to TCI-state ID#50),

For CC3, 100 TCI states are configured (TCI-state ID#1 to TCI-state ID#100)

If the message is transmitted via CC1 and the specific TCI states are based on TCI state IDs (#1, 2, 4, 5, 21, 22, 24, 25), TCI states (#1 to #100, #1 to #50, #1 to #100) configured in the specific frequency domains CC1, CC2 and CC3 fully overlap the specific TCI states (#1, 2, 4, 5, 21, 22, 24, 25), respectively. Hence, the specific TCI states (#1, 2, 4, 5, 21, 22, 24, 25) can be activated for the specific frequency domains CC1, CC2 and CC3.

If the message is transmitted via CC 1 and the specific TCI states are based on TCI state IDs (#1, 2, 4, 5, 51, 52, 54, 55), the TCI states (#1 to #50) configured in one frequency domain CC2 of the specific frequency domains CC1, CC2 and CC3 partially overlap the specific TCI states (#1, 2, 4, 5, 51, 52, 54, 55). Hence, the specific TCI states (#1, 2, 4, 5, 51, 52, 54, 55) can be activated for the frequency domain CC1 related to the transmission of the message among the specific frequency domains CC1, CC2 and CC3. In this case, this is the same as the operation according to the existing method.

According to an embodiment, the message represents specific TCI states, and the activated TCI states may be based on all or some of the specific TCI states. The present embodiment may be based on the proposal 3.

For a frequency domain configured with TCI states including all the specific TCI states among the specific frequency domains, all the specific TCI states may be activated.

For a frequency domain configured with TCI states including some of the specific TCI states among the specific frequency domains, some of the specific TCI states may be activated.

The above-described embodiments assume a case in which CC1, CC2 and CC3 are configured to the UE and the TCI state is configured to each CC as follows, and the case is described in detail below.

For CC1, 100 TCI states are configured (TCI-state ID#1 ~ TCI-state ID#100),

For CC2, 50 TCI states are configured (TCI-state ID#1 ~ TCI-state ID#50),

For CC3, 100 TCI states are configured (TCI-state ID#1 ~ TCI-state ID#100)

It may be assumed that the message is transmitted via CC1 and the specific TCI states are based on TCI state IDs (#1, 2, 4, 5, 51, 52, 54, 55).

For the frequency domains CC1 and CC3 configured with TCI states (#1 to 100 and #1 to 100) including all (#1, 2, 4, 5, 51, 52, 54, 55) the specific TCI states among the specific frequency domains CC1, CC2 and CC3, all the specific TCI states may be activated.

For the frequency domain CC2 configured with TCI states (#1 to 50) including some (#1, 2, 4, 5) of the specific TCI states among the specific frequency domains CC1, CC2 and CC3, some of the specific TCI states may be activated.

According to an embodiment, if the activated TCI states are based on some of the specific TCI states, some of the specific TCI states may be mapped to a plurality of states related to a transmission configuration indication field of the DCI based on a pre-configured pattern. The present embodiment may be based on the proposal 3.

The pre-configured pattern may be a pattern in which some of the specific TCI states are repeated in a specific order based on the TCI state ID.

According to the step S1520, an operation of the base station (100/200 of FIGS. 16 to 20) to transmit the message representing the activation of the TCI state related to the PDSCH to the UE (100/200 of FIGS. 16 to 20) may be implemented by the device of FIGS. 16 to 20. For example, referring to FIG. 17, one or more processors 202 may control one or more transceivers 206 and/or one or more memories 204 so as to transmit the message representing the activation of the TCI state related to the PDSCH to the UE 100.

In the step S1530, the base station transmits, to the UE, downlink control information (DCI) scheduling the PDSCH. The DCI represents one TCI state of the TCI states activated by the message.

According to the step S1530, an operation of the base station (100/200 of FIGS. 16 to 20) to transmit the DCI scheduling the PDSCH to the UE (100/200 of FIGS. 16 to 20) may be implemented by the device of FIGS. 16 to 20. For example, referring to FIG. 17, one or more processors 202 may control one or more transceivers 206 and/or one or more memories 204 so as to transmit the DCI scheduling the PDSCH to the UE 100.

In the step S1540, the base station transmits the PDSCH to the UE based on the DCI.

According to the step S1540, an operation of the base station (100/200 of FIGS. 16 to 20) to transmit the PDSCH to the UE (100/200 of FIGS. 16 to 20) based on the DCI may be implemented by the device of FIGS. 16 to 20. For example, referring to FIG. 17, one or more processors 202 may control one or more transceivers 206 and/or one or more memories 204 so as to transmit the PDSCH to the UE 100 based on the DCI.

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 16:
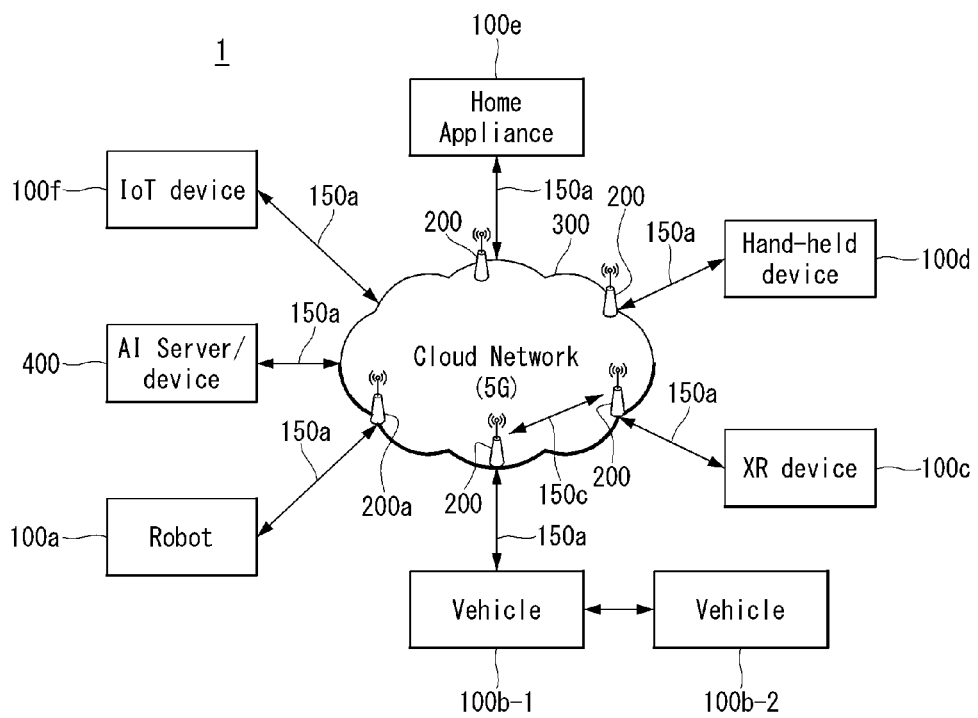
FIG. 16 illustrates a communication system 1 applied to the present disclosure.

FIG. 16 illustrates a communication system 1 applied to the present disclosure.

Referring to FIG. 16, a communication system 1 applied to the present disclosure includes wireless devices, Base Stations (BSs), and a network. Herein, the wireless devices represent devices performing communication using Radio Access Technology (RAT) (e.g., 5(3 New RAT (NR)) or Long-Term Evolution (LTE)) and may be referred to as communication/radio/5G devices. The wireless devices may include, without being limited to, a robot 100a, vehicles 100b-1 and 100b-2, an extended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (VZV)/Vehicle-to-evervthing (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. Relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of wireless device applied to the present disclosure.

FIG. 17 illustrates wireless devices applicable to the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s)

102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Example of signal processing circuit applied to the present disclosure

Figure 18:
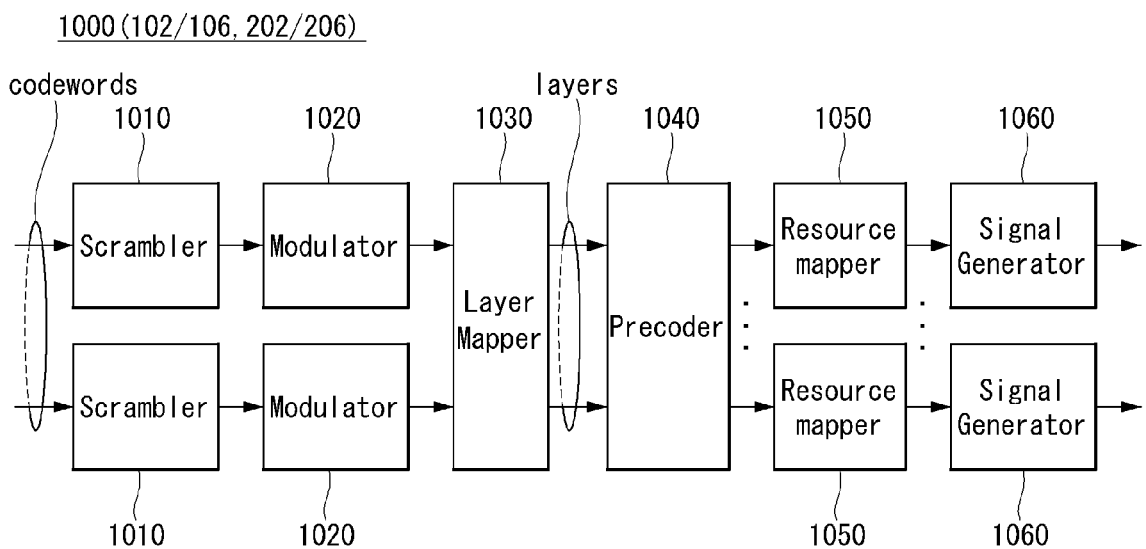
FIG. 18 illustrates a signal process circuit for a transmission signal.

FIG. 18 illustrates a signal process circuit for a transmission signal.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform preceding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules. Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of application of wireless device applied to the present disclosure

Figure 19:
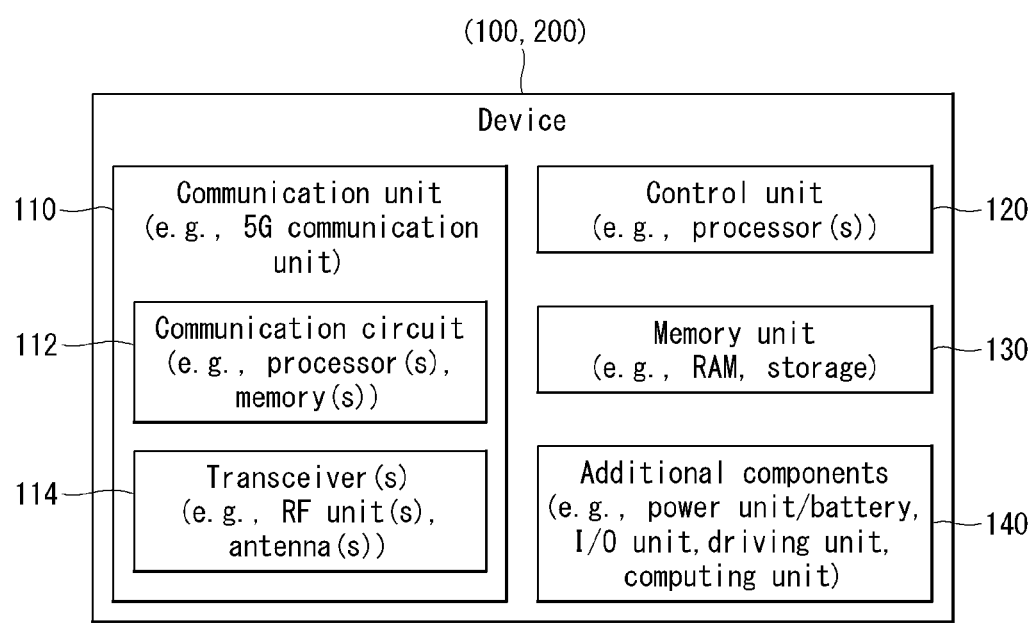
FIG. 19 illustrates another example of a wireless device applied to the present disclosure.

FIG. 19 illustrates another example of a wireless device applied to the present disclosure.

The wireless device may be implemented in various forms according to a use-case/service (refer to FIG. 16). Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 16), the vehicles (100b-1 and 100b-2 of FIG. 16), the XR device (100c of FIG. 16), the hand-held device (100d of FIG. 16), the home appliance (100e of FIG. 16), the IoT device (100f of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, anon-volatile memory, and/or a combination thereof.

Example of Hand-Held Device Applied to the Present Disclosure

Figure 20:
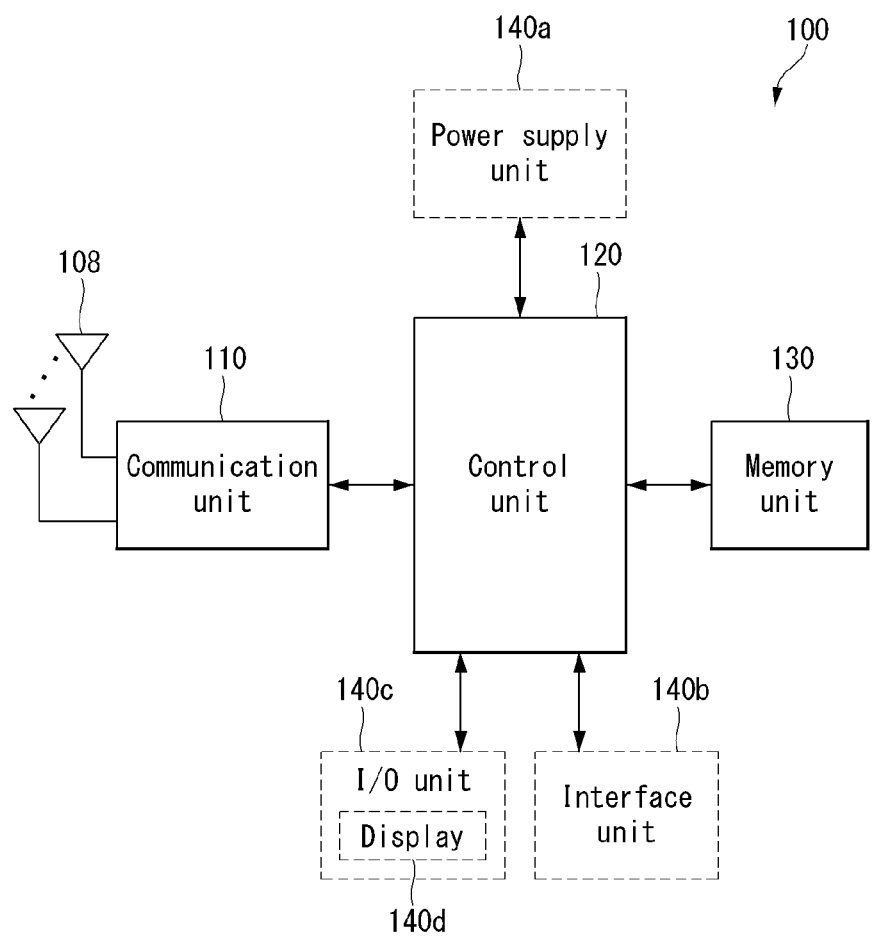
FIG. 20 illustrates a hand-held device applied to the present disclosure.

FIG. 20 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 20, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Effects of a method of transmitting and receiving a physical downlink shared channel and a device therefor in a wireless communication system according to embodiments of the present disclosure are described as follows.

According to embodiments of the present disclosure, TCI states can be activated for specific frequency domains based on a list which is pre-configured via higher layer signaling.

Accordingly, since the activation of the TCI states can be equally applied to the frequency domains based on the pre-configured list, an overhead of control signaling related to the activation of the TCI states can be reduced. Further, a beam can be updated more efficiently than when a common beam is used for a plurality of frequency domains.

As described above, according to embodiments of the present disclosure, latency and overhead related to a transmission/reception procedure of the PDSCH can be reduced.

Here, wireless communication technology implemented in wireless devices 100 and 200 of FIG. 17 of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100 and 200 of FIG. 17 of the present disclosure may perform communication based on LTE-M technology. In this case, as an example, the LTE-M technology may be an example of the LPWAN and may be called various names including enhanced Machine Type Communication (eMTC), and the like. For example, the LTE-M technology may be implemented as at least any one of various standards such as 1) LTE CAT 0, 2) LTE Cat M1 3) LTE Cat M2, 4) LTE non-Bandwidth Limited (non-BL), 5) LTE-MTC, 6) LTE Machine Type Communication, and/or 7) LTE M. Additionally or alternatively, the wireless communication technology implemented in the wireless devices 100 and 200 of FIG. 17 of the present disclosure may includes at least one of ZigBee, Bluetooth, and Low Power Wide Area Network (LPWAN) considering the low-power communication, and is not limited to the name described above. As an example, the ZigBee technology may generate personal area networks (PAN) associated with small/low-power digital communication based on various standards including IEEE 802.15.4, and the like, and may be called various names.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method performed by a user equipment (UE) in a wireless communication system, the method comprising:
   receiving configuration information which includes a plurality of simultaneous Transmission Configuration Indicator (TCI) update lists,
   wherein each of the plurality of simultaneous TCI update lists includes information related to serving cells which are updated simultaneously for one or more TCI states related to a Medium Access Control Control Element (MAC CE), and the serving cells are related to Component Carriers (CCs); and
   receiving the MAC CE which is related to an activation of the one or more TCI states and includes a serving cell ID of a serving cell which is configured as part of one of the plurality of simultaneous TCI update lists,
   wherein the one or more TCI states are activated for a set of i) the CCs and ii) downlink bandwidth parts (DL BWPs), corresponding to the serving cells which are determined by the serving cell ID,
   wherein the serving cell ID is a 5 bit field, and
   wherein the DL BWPs are based on all DL BWPs in the CCs.

2. The method of claim 1, wherein the activated one or more TCI states are based on a set of TCI state IDs indicated by the MAC CE.

3. The method of claim 1, further comprising: receiving information for a plurality of TCI states,
   wherein the at least one TCI state is included in the plurality of TCI states.

4. A user equipment (UE) operating in a wireless communication system, the UE comprising:
   one or more transceivers;
   one or more processors configured to control the one or more transceivers; and
   one or more memories operably connected to the one or more processors,
   wherein the one or more memories store instructions, based on being executed by the one or more processors, performing operations comprising:
   receiving configuration information which includes a plurality of simultaneous Transmission Configuration Indicator (TCI) update lists,
   wherein each of the plurality of simultaneous TCI update lists includes information related to serving cells which are updated simultaneously for one or more TCI states related to a Medium Access Control Control Element (MAC CE), and the serving cells are related to Component Carriers (CCs); and
   receiving the MAC CE which is related to an activation of the one or more TCI states and includes a serving cell ID of a serving cell which is configured as part of one of the plurality of simultaneous TCI update lists,
   wherein the one or more TCI states are activated for a set of i) the CCs and ii) downlink bandwidth parts (DL BWPs), corresponding to the serving cells which are determined by the serving cell ID,
   wherein the serving cell ID is a 5 bit field, and
   wherein the DL BWPs are based on all DL BWPs in the CCs.

5. The UE of claim 4, wherein the activated one or more TCI states are based on a set of TCI state IDs indicated by the MAC CE.

6. The UE of claim 4, further comprising: receiving information for a plurality of TCI states,
   wherein the at least one TCI state is included in the plurality of TCI states.

7. A base station operating in a wireless communication system, the base station comprising:
   one or more transceivers;
   one or more processors configured to control the one or more transceivers; and one or more memories operably connected to the one or more processors,
wherein the one or more memories store instructions, based on being executed by the one or more processors, performing operations comprising:
    transmitting configuration information which includes a plurality of simultaneous Transmission Configuration Indicator (TCI) update lists,
    wherein each of the plurality of simultaneous TCI update lists includes information related to serving cells which are updated simultaneously for one or more TCI states related to a Medium Access Control Control Element (MAC CE), and the serving cells are related to Component Carriers (CCs); and
    transmitting the MAC CE which is related to an activation of the one or more TCI states and includes a serving cell ID of a serving cell which is configured as part of one of the plurality of simultaneous TCI update lists,
    wherein the one or more TCI states are activated for a set of i) the CCs and ii) downlink bandwidth parts (DL BWPs), corresponding to the serving cells which are determined by the serving cell ID,
    wherein the serving cell ID is a 5 bit field, and
    wherein the DL BWPs are based on all DL BWPs in the CCs.

8. The base station of claim 7, wherein the activated one or more TCI states are based on a set of TCI state IDs indicated by the MAC CE.

9. The base station of claim 7, further comprising: transmitting information for a plurality of TCI states,
    wherein the at least one TCI state is included in the plurality of TCI states.

* * * * *